US011481956B2

(12) United States Patent
Imasugi

(10) Patent No.: US 11,481,956 B2
(45) Date of Patent: Oct. 25, 2022

(54) MEDICAL IMAGE PROCESSING APPARATUS AND MEDICAL IMAGE PROCESSING METHOD USING DEPTH-DEPENDENT TRANSMITTANCE AND OPACITY INFORMATION

(71) Applicant: CANON MEDICAL SYSTEMS CORPORATION, Otawara (JP)

(72) Inventor: Yusuke Imasugi, Kisarazu (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 52 days.

(21) Appl. No.: 16/796,509

(22) Filed: Feb. 20, 2020

(65) Prior Publication Data

US 2020/0320774 A1 Oct. 8, 2020

(30) Foreign Application Priority Data

Feb. 20, 2019 (JP) .............................. JP2019-028713

(51) Int. Cl.
*G06T 15/00* (2011.01)
*G06T 15/08* (2011.01)
*G06T 15/20* (2011.01)

(52) U.S. Cl.
CPC ............ *G06T 15/08* (2013.01); *G06T 15/205* (2013.01); *G06T 2210/41* (2013.01)

(58) Field of Classification Search
CPC ... G06T 2207/10028; G06T 7/50; G06T 7/90; H04N 13/282; H04N 5/2226; H04N 9/3194; A61B 6/466
See application file for complete search history.

(56) References Cited

U.S. PATENT DOCUMENTS

2004/0057613 A1* 3/2004 Noto ....................... G06T 7/586
382/154
2009/0015587 A1* 1/2009 Hashimoto .............. A61B 8/06
345/424

(Continued)

FOREIGN PATENT DOCUMENTS

JP 2018-089343 A 6/2018

*Primary Examiner* — Weiming He
(74) *Attorney, Agent, or Firm* — Oblon, McClelland, Maier & Neustadt, L.L.P.

(57) ABSTRACT

A medical image processing apparatus according to embodiments includes processing circuitry. The processing circuitry acquires three-dimensional medical image data in which a structure of a subject is rendered. The processing circuitry sets an eye point and an eye direction in the three-dimensional medical image data, generates two-dimensional first medical image data from the three-dimensional medical image data, and generates two-dimensional second medical image data in which display manners differ between a first portion on the opposite side to the eye point side in the eye direction of the structure rendered in the two-dimensional first medical image data and a second portion on the eye point side of the structure rendered in the two-dimensional first medical image data. The processing circuitry displays a medical image represented by the second medical image data on a display. The processing circuitry further generates two-dimensional depth information corresponding to a plurality of pixels that constitute the two-dimensional first medical image data and generates the second medical image data in which display manners differ between the first portion constituted with a pixel with the depth information equal to or greater than a threshold and the second portion constituted with a pixel with the depth information less than the threshold, in data of the plurality of pixels that constitute the first medical image data, based on the depth information.

10 Claims, 20 Drawing Sheets

(56) References Cited

U.S. PATENT DOCUMENTS

2011/0181590 A1* 7/2011 Brabec .................... G06T 15/00
　　　　　　　　　　　　　　　　　　　　　　345/424
2016/0361043 A1* 12/2016 Kim ..................... A61B 8/0808
2020/0124849 A1* 4/2020 Tsuji .................... H04N 9/3194

* cited by examiner

MEDICAL IMAGE PROCESSING APPARATUS AND MEDICAL IMAGE PROCESSING METHOD USING DEPTH-DEPENDENT TRANSMITTANCE AND OPACITY INFORMATION

CROSS-REFERENCE TO RELATED APPLICATIONS

This application is based upon and claims the benefit of priority from Japanese Patent Application No. 2019-028713, filed on Feb. 20, 2019; the entire contents of which are incorporated herein by reference.

FIELD

Embodiments described herein relate to a medical image processing apparatus and a medical image processing method.

BACKGROUND

Conventionally, there is a medical image processing apparatus that generates volume rendering image data from three-dimensional medical image data collected by an X-ray computed tomography (CT) device and a magnetic resonance imaging (MRI) device. The medical image processing apparatus displays a volume rendering image represented by the volume rendering image data on a display. The user who views the volume rendering image thus can grasp a variety of three-dimensional information.

DETAILED DESCRIPTION

A medical image processing apparatus according to embodiments includes processing circuitry. The processing circuitry acquires three-dimensional medical image data in which a structure of a subject is rendered. The processing circuitry sets an eye point and an eye direction in the three-dimensional medical image data, generates two-dimensional first medical image data from the three-dimensional medical image data, and generates two-dimensional second medical image data in which display manners differ between a first portion on the opposite side to the eye point side in the eye direction of the structure rendered in the two-dimensional first medical image data and a second portion on the eye point side of the structure rendered in the two-dimensional first medical image data. The processing circuitry displays a medical image represented by the second medical image data on a display. The processing circuitry further generates two-dimensional depth information corresponding to a plurality of pixels that constitute the two-dimensional first medical image data and generates the second medical image data in which display manners differ between the first portion constituted with a pixel with the depth information equal to or greater than a threshold and the second portion constituted with a pixel with the depth information less than the threshold, in data of the plurality of pixels that constitute the first medical image data, based on the depth information.

A medical image processing apparatus and a medical image processing method according to embodiments will be described below with reference to the drawings. The description in one embodiment or modification may be applied similarly to other embodiments or modifications.

First Embodiment

Figure 1:
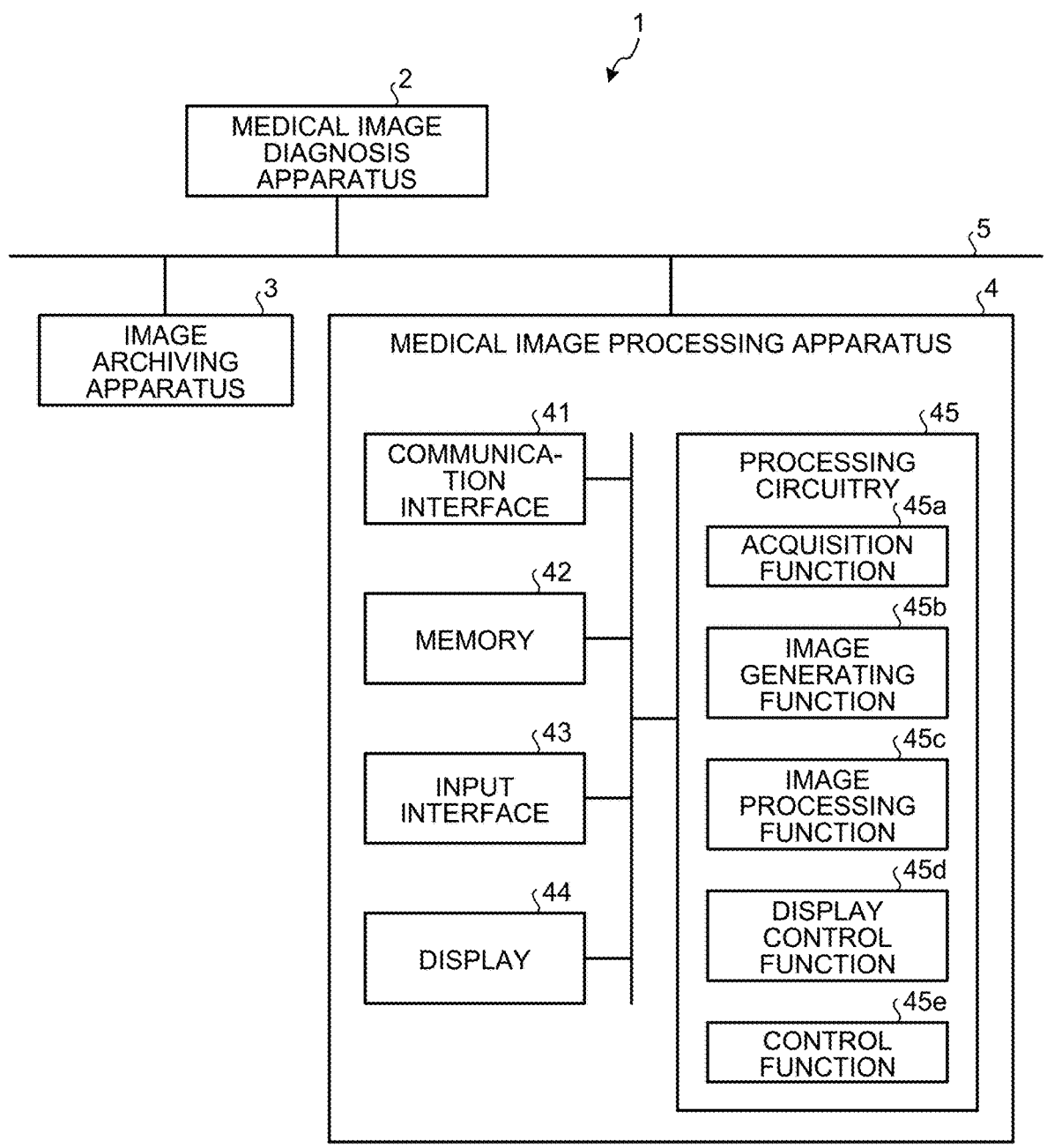
FIG. 1 is a diagram illustrating a configuration example of an image processing system according to a first embodiment.

First of all, a configuration example of an image processing system according to a first embodiment will be described. FIG. 1 is a diagram illustrating a configuration example of the image processing system according to the first embodiment.

As illustrated in FIG. 1, an image processing system 1 according to the first embodiment includes a medical image diagnosis apparatus 2, an image archiving apparatus 3, and a medical image processing apparatus 4. The apparatuses illustrated in FIG. 1 can directly or indirectly communicate with each other, for example, through an in-hospital local area network (LAN) 5 installed in a hospital. For example, when a picture archiving and communication system (PACS) is introduced in the image processing system 1, the apparatuses transmit/receive medical image data and the like to/from each other in compliance with the Digital Imaging and Communications in Medicine (DICOM) standards.

Each apparatus illustrated in FIG. 1 transmits and receives data of the DICOM standards so that data received from another apparatus can be read or displayed in the apparatus itself. In the present embodiment, data compliant with any standards may be transmitted and received as long as data received from another apparatus can be processed by the apparatus itself.

The medical image diagnosis apparatus 2 is, for example, an X-ray CT device or an MRI device. The medical image diagnosis apparatus 2 collects three-dimensional medical image data. For example, the medical image diagnosis apparatus 2 collects three-dimensional medical image data in which a structure such as a cardiac blood vessel of a subject is rendered. Each of a plurality of voxels that constitute the three-dimensional medical image data has a signal value. The three-dimensional medical image data is also referred to as volume data.

When the medical image diagnosis apparatus 2 is an X-ray CT device, the medical image diagnosis apparatus 2 collects three-dimensional X-ray CT image data as three-dimensional medical image data. The medical image diagnosis apparatus 2 then transmits the three-dimensional medical image data to the image archiving apparatus 3. Upon receiving a transmission request transmitted from the medical image processing apparatus 4 for transmitting the three-dimensional medical image data, the medical image diagnosis apparatus 2 transmits the three-dimensional medical image data to the medical image processing apparatus 4 based on the transmission request.

The image archiving apparatus 3 is a database for archiving medical image data. For example, the image archiving apparatus 3 is implemented by a computer device such as a server device. For example, the image archiving apparatus 3 archives medical image data by storing three-dimensional medical image data transmitted from the medical image diagnosis apparatus 2 into storage circuitry. As used herein, the storage circuitry is implemented by, for example, a semiconductor memory device such as flash memory, a hard disk, or an optical disc. The medical image data archived in the image archiving apparatus 3 is archived, for example, in association with supplementary information such as a subject ID that is the identifier (ID) of a subject, a test ID that is the ID of a test conducted for the subject, and an apparatus ID that is the ID of the apparatus used in the test.

The in-hospital LAN 5 connects the medical image diagnosis apparatus 2, the image archiving apparatus 3, and the medical image processing apparatus 4 such that the medical image diagnosis apparatus 2, the image archiving apparatus 3, and the medical image processing apparatus 4 can communicate.

The medical image processing apparatus 4 acquires three-dimensional medical image data from the medical image diagnosis apparatus 2 and the image archiving apparatus 3 through the in-hospital LAN 5. The medical image processing apparatus 4 then performs a variety of processing on the three-dimensional medical image data. For example, the medical image processing apparatus 4 generates volume rendering image data from the three-dimensional medical image data. The medical image processing apparatus 4 then performs a variety of processing on the volume rendering image data. The medical image processing apparatus 4 then displays a medical image (volume rendering image) represented by the volume rendering image data subjected to a variety of processing, on a display 44 described later.

As illustrated in FIG. 1, the medical image processing apparatus 4 includes a communication interface 41, a memory 42, an input interface 43, a display 44, and processing circuitry 45.

The communication interface 41 is connected to the processing circuitry 45 and controls transmission of a variety of data between the medical image diagnosis apparatus 2 and the medical image processing apparatus 4. The communication interface 41 also controls transmission of a variety of data between the image archiving apparatus 3 and the medical image processing apparatus 4. For example, the communication interface 41 is implemented, for example, by a network card, a network adapter, or a network interface controller (NIC). For example, the communication interface 41 receives three-dimensional medical image data from the medical image diagnosis apparatus 2 and the image archiving apparatus 3. The communication interface 41 then outputs the received three-dimensional medical image data to the processing circuitry 45.

The memory 42 is connected to the processing circuitry 45 and stores a variety of data. For example, the memory 42 is implemented by a semiconductor memory device such as RAM and flash memory, a hard disk, or an optical disc. In the present embodiment, the memory 42 stores three-dimensional medical image data received from the medical image diagnosis apparatus 2 and the image archiving apparatus 3.

The memory 42 also stores a variety of information used for processing in the processing circuitry 45, the process result by the processing circuitry 45, and the like. For example, the memory 42 stores medical image data for display generated by the processing circuitry 45. The memory 42 is an example of the storage unit.

The input interface 43 is connected to the processing circuitry 45 and converts an input operation accepted from the operator into an electrical signal to output the converted electrical signal to the processing circuitry 45. For example, the input interface 43 is implemented by a track ball, a switch button, a mouse, and a keyboard for performing a variety of settings, a touchpad with an operation screen touched for performing an input operation, a touchscreen in which a display screen and a touchpad are integrated, a contactless input device using an optical sensor, or a voice input device.

The display 44 is connected to the processing circuitry 45 and displays a variety of information and a variety of images output from the processing circuitry 45. For example, the display 44 is implemented by a liquid crystal monitor or a CRT monitor. For example, the display 44 displays a GUI for accepting the operator's instruction, a variety of images for display, and a variety of process results by the processing circuitry 45. The display 44 is an example of the display unit.

The processing circuitry 45 controls a variety of components of the medical image processing apparatus 4 in accordance with an input operation accepted from the operator through the input interface 43. For example, the processing circuitry 45 is implemented by a processor.

As illustrated in FIG. 1, the processing circuitry 45 includes an acquisition function 45a, an image generating function 45b, an image processing function 45c, a display control function 45d, and a control function 45e. Here, for example, the processing functions such as the acquisition function 45a, the image generating function 45b, the image processing function 45c, the display control function 45d, and the control function 45e, which are components of the processing circuitry 45 illustrated in FIG. 1, are stored in the memory 42 in the form of a computer program executable by a computer. The processing circuitry 45 reads a computer program from the memory 42 and executes the read computer program to implement the function corresponding to the computer program. In other words, the processing circuitry 45 in a state in which each computer program is read has the corresponding function illustrated in the processing circuitry 45 in FIG. 1.

All of the processing functions of the acquisition function 45a, the image generating function 45b, the image processing function 45c, the display control function 45d, and the control function 45e may be stored in the memory 42 in the form of one computer program executable by a computer. For example, such a computer program is also referred to as a medical image processing program. In this case, the processing circuitry 45 reads the medical image processing program from the memory 42 and executes the read medical image processing program to implement the acquisition function 45a, the image generating function 45b, the image processing function 45c, the display control function 45d, and the control function 45e corresponding to the medical image processing program.

The term "processor" used in the foregoing description means, for example, circuitry such as a central processing unit (CPU), a graphics processing unit (GPU), an application specific integrated circuit (ASIC), or a programmable logic device (for example, a simple programmable logic device (SPLD), a complex programmable logic device (CPLD), or a field programmable gate array (FPGA)). The processor reads and executes a computer program stored in the memory 42 to implement a function. A computer program may be directly built in circuitry of the processor, rather than storing a computer program in the memory 42. In this case, the processor reads and executes the computer program built in the circuitry to implement a function. The processors in the present embodiment may be configured as a single circuit for each processor, or a plurality of independent circuits may be combined into one processor to implement the functions. Alternatively, a plurality of components in FIG. 1 may be integrated into one processor to implement the functions.

The acquisition function 45a acquires three-dimensional medical image data. For example, the acquisition function 45a transmits a transmission request for transmitting three-dimensional medical image data to the medical image diagnosis apparatus 2 through the communication interface 41 and the in-hospital LAN 5. Upon receiving such a transmission request, the medical image diagnosis apparatus 2 transmits three-dimensional medical image data to the communication interface 41 of the medical image processing apparatus 4 in response to the transmission request. Upon receiving the three-dimensional medical image data, the communication interface 41 transmits the three-dimensional medical image data to the acquisition function 45a of the processing circuitry 45. The acquisition function 45a receives the three-dimensional medical image data transmitted from the communication interface 41. The acquisition function 45a then stores the three-dimensional medical image data into the memory 42. The acquisition function 45a then acquires the three-dimensional medical image data stored in the memory 42. The three-dimensional medical image data acquired by the acquisition function 45a is used for a variety of processing by the image generating function 45b, the image processing function 45c, the display control function 45d, and the control function 45e. The acquisition function 45a is an example of the acquisition unit. The acquisition function 45a may acquire three-dimensional medical image data from the image archiving apparatus 3.

The image generating function 45b generates medical image data for display from the three-dimensional medical image data acquired by the acquisition function 45a. For example, the image generating function 45b generates volume rendering image data by setting an eye point and an eye direction and performing volume rendering for three-dimensional medical image data. For example, the image generating function 45b generates volume rendering image data by parallel projection. In this way, the image generating function 45b sets an eye point and an eye direction in the three-dimensional medical image data and generates two-dimensional volume rendering image data from the three-dimensional medical image data. The image generating function 45b is an example of the generation unit. Volume rendering image data is an example of first medical image data. In the following description, a volume rendering image represented by volume rendering image data may be denoted as "first image". The first image is an example of the first medical image.

Figure 2:
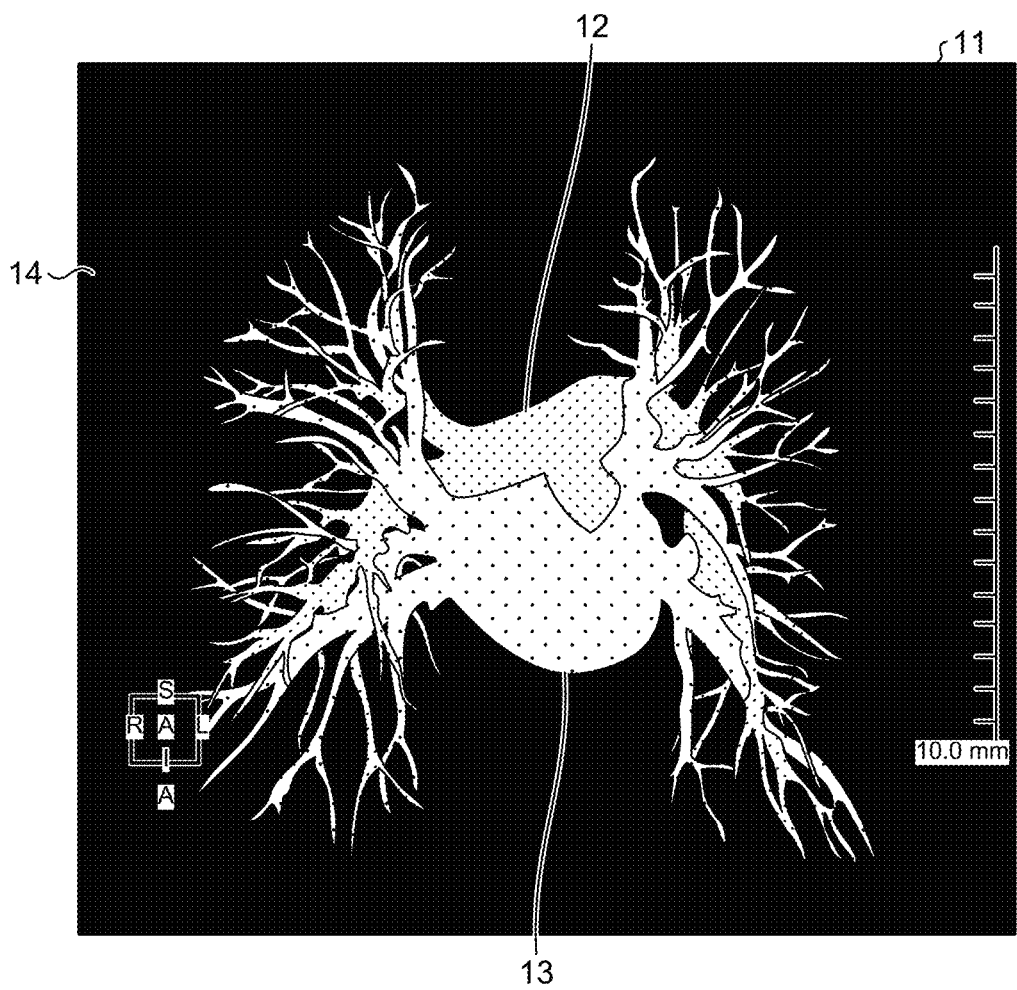
FIG. 2 is a diagram illustrating an example of a first image according to the first embodiment.

FIG. 2 is a diagram illustrating an example of the first image according to the first embodiment. For example, the image generating function 45b generates volume rendering image data representing a first image 11 illustrated in FIG. 2. In the first image 11, a pulmonary artery 12 and a pulmonary vein 13 are rendered as structures of a subject. In FIG. 2, the pulmonary artery 12 and the pulmonary vein 13 are schematically illustrated. The color of a background 14 of the first image 11 is black.

In volume rendering, the image generating function 45b allocates a color to each of a plurality of pixels that constitute the first image 11, based on a signal value of each voxel. For example, the color allocated to all the pixels that constitute the region of the pulmonary artery 12 is red, and the color allocated to all the pixels that constitute the region of the pulmonary vein 13 is blue. The image generating function 45b may allocate a color by any other methods. For example, first, the image generating function 45b performs a segmentation process for extracting the region of the pulmonary artery 12 and the region of the pulmonary vein 13 from three-dimensional medical image data to extract the region of the pulmonary artery 12 and the region of the pulmonary vein 13. The image generating function 45b then may allocate a predetermined color (for example, red) to a plurality of voxels that constitute the region of the pulmonary artery 12. The image generating function 45b may allocate a predetermined color (for example, blue) to a plurality of voxels that constitute the region of the pulmonary vein 13.

The pulmonary artery 12 has a complicated shape. The pulmonary artery 12 is rendered in the same color (red). It is therefore difficult for the user to identify which portion of the pulmonary artery 12 is located on the front side and which portion is located on the back side even by viewing the pulmonary artery 12 appearing on the display 44.

Similarly, the pulmonary vein 13 has a complicated shape and is rendered in the same color (blue). It is therefore difficult for the user to identify which portion of the pulmonary vein 13 is located on the front side and which portion is located on the back side even by viewing the pulmonary vein 13 appearing on the display 44.

That is, it is difficult for the user to grasp the positional relation in the depth direction of a plurality of portions of the pulmonary artery 12 and a plurality of portions of the pulmonary vein 13.

Then, the medical image processing apparatus 4 according to the first embodiment performs a variety of processing described below to allow the user to easily grasp the positional relation in the depth direction of a plurality of portions of the pulmonary artery 12 and a plurality of portions of the pulmonary vein 13.

For example, when volume rendering image data representing the first image 11 is generated, the image generating function 45b calculates depth information for each of all the pixels that constitute the first image 11. The depth information is, for example, information indicating the distance from the eye point to a structure closest to the eye point of the structures (objects) rendered by pixels. In the present embodiment, the depth information is a value in a range from −1.00 or more to 1.00 or less. For example, when a structure closest to the eye point of the structures rendered in the first image 11 is rendered in a certain pixel, −1.00 is set as depth information for this pixel. When a structure farthest from the eye point of the structures rendered in the first image 11 is a structure closest to the eye point of the structures rendered by a certain pixel, 1.00 is set as depth information for this pixel.

The image generating function 45b then stores the depth information of all the pixels into the memory 42. Of the storage regions in the memory 42, the storage region in which depth information is stored is referred to as Z buffer, depth buffer, and the like.

For example, the plurality of pixels that constitute the first image 11 are pixels arranged in a two-dimensional form. Thus, a plurality of depth information corresponding to all the pixels are arranged in a two-dimensional form. That is, the image generating function 45b generates two-dimensional depth information corresponding to a plurality of pixels that constitute two-dimensional volume rendering image data.

Figure 3:
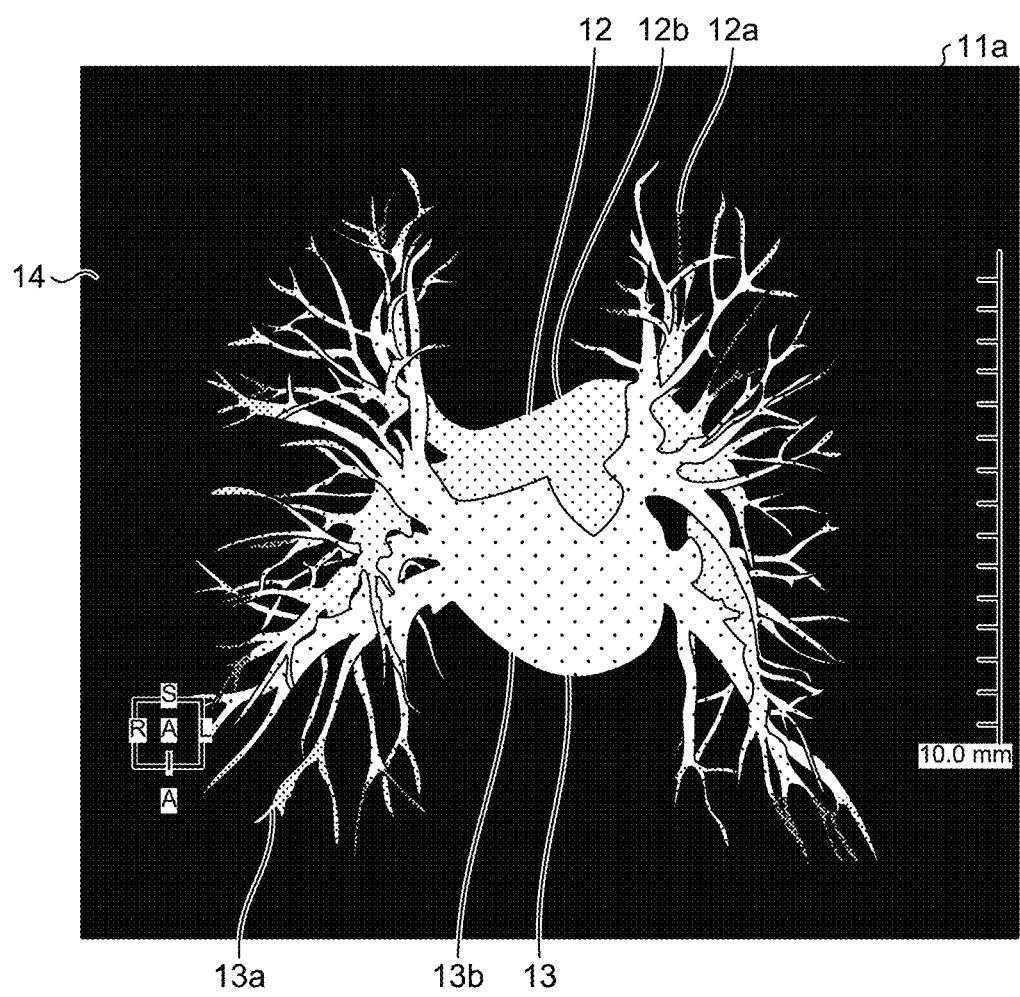
FIG. 3 is a diagram illustrating an example of medical image data generated by an image processing function according to the first embodiment.

The image processing function 45c performs image processing on volume rendering image data based on the depth information to generate two-dimensional medical image data that allows the user to easily grasp the positional relation in the depth direction of a plurality of portions of the pulmonary artery 12 and a plurality of portions of the pulmonary vein 13. In the following description, a medical image represented by such medical image data may be denoted as "second image". The second image is an example of the second medical image. FIG. 3 is a diagram illustrating an example of medical image data generated by the image processing function according to the first embodiment. For example, the image processing function 45c generates two-dimensional medical image data representing a second image 11a illustrated in FIG. 3. For example, the pulmonary artery 12 and the pulmonary vein 13 are rendered in the second image 11a.

The pulmonary artery 12 has a back-side portion 12a with depth information equal to or greater than a first threshold and a front-side portion 12b with depth information less than the first threshold. The pulmonary vein 13 has a back-side portion 13a with depth information equal to or greater than a first threshold and a front-side portion 13b with depth information less than the first threshold. Display manners differ between the portion 12a and the portion 12b. Similarly, display manners differ between the portion 13a and the portion 13b. The portion 12a and the portion 13a are an example of the first portion. The portion 12b and the portion 13b are an example of the second portion.

An example of the method of generating medical image data representing such a second image 11a will be described. For example, the image processing function 45c compares depth information with the first threshold for each pixel that constitutes the first image 11. Specifically, the image processing function 45c determines whether the depth information is equal to or greater than the first threshold, pixel by pixel. The first threshold can be set by the user on a setting screen 20 described later.

The image processing function 45c then generates medical image data representing the second image 11a in FIG. 3 by combining pixel data with image data for composition of one pixel, pixel by pixel, for pixels with depth information equal to or greater than the first threshold in volume rendering image data. The image data for composition is, for example, image data having predetermined opacity (the degree of opaqueness) and to which the same color as the background 14 is allocated. The opacity of the image data for composition is greater than 0.00 (fully transparent) and less than 1.00 (fully opaque). This opacity can be set by the user on the setting screen 20 described later.

With such a method, the image processing function 45c can generate medical image data representing the second image 11a based on three-dimensional medical image data as if a black plate (film) having planar transmittance in which the eye direction is a normal vector is arranged as image data for composition at a position at a distance corresponding to the first threshold from the eye point. That is, the image processing function 45c can generate two-dimensional medical image data based on three-dimensional medical image data as if the plate having opacity is arranged as image data for composition at a position corresponding to the first threshold. Such a plate is also referred to as background plate.

As described above, the image processing function 45c generates two-dimensional medical image data in which display manners differ between the portion 12a on the opposite side to the eye point side in the eye direction of the pulmonary artery 12 rendered in two-dimensional volume rendering image data and the portion 12b on the eye point side of the pulmonary artery 12 rendered in two-dimensional volume rendering image data. The image processing function 45c generates two-dimensional medical image data in which display manners differ between the portion 13a on the opposite side to the eye point side in the eye direction of the pulmonary vein 13 rendered in two-dimensional volume rendering image data and the portion 13b on the eye point side of the pulmonary vein 13 rendered in two-dimensional volume rendering image data. Such medical image data in which display manners differ between the portion 12a, 13a and the portion 12b, 13b is an example of second medical image data. The image processing function 45c is an example of the generation unit.

The image processing function 45c generates medical image data in which display manners differ between the portion 12a, 13a constituted with a pixel with depth information equal to or greater than the first threshold and the portion 12b, 13b constituted with a pixel with depth information less than the first threshold, in data of a plurality of pixels that constitute volume rendering image data, based on the depth information.

Figure 4:
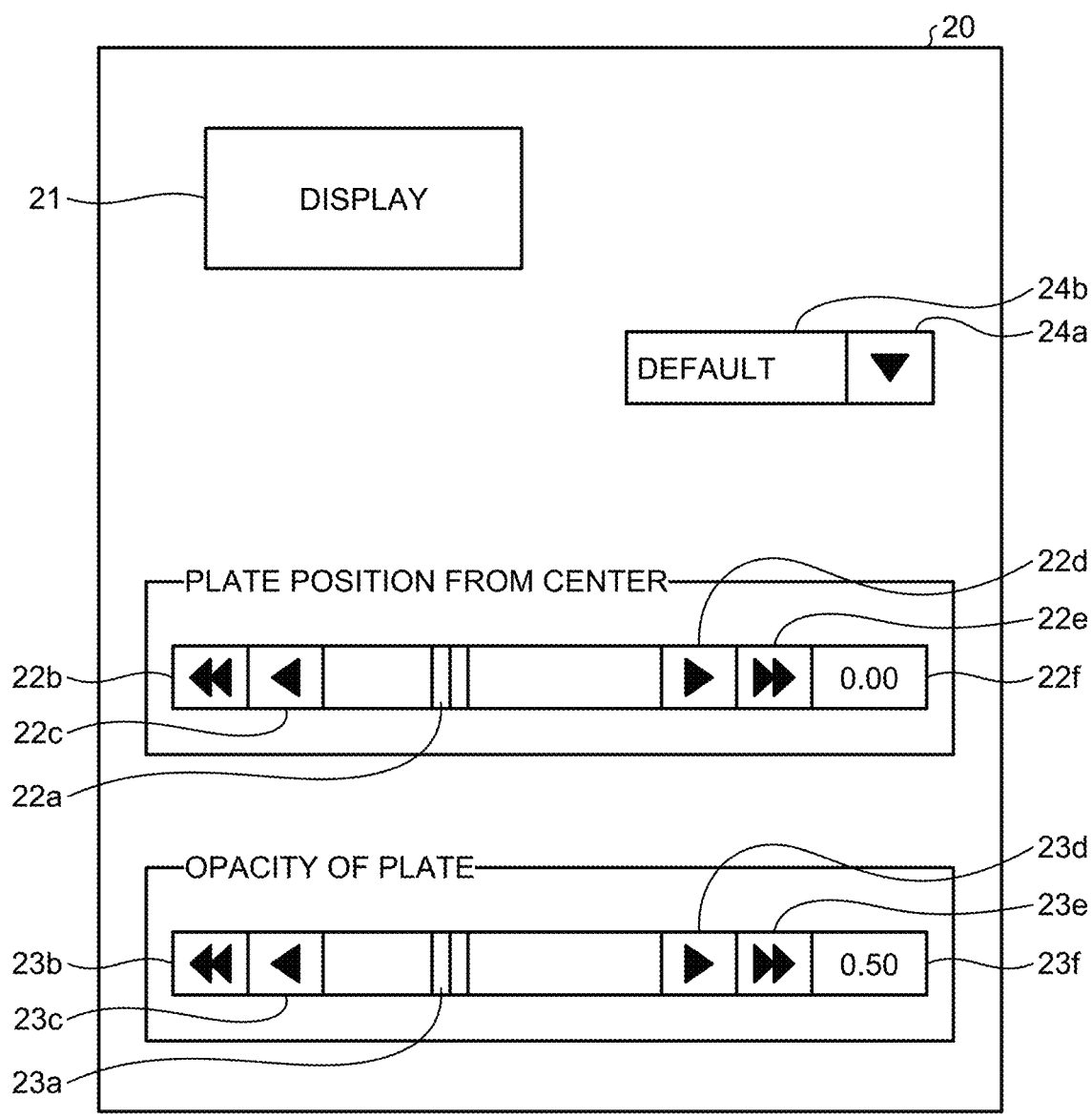
FIG. 4 is a diagram illustrating an example of a setting screen according to the first embodiment.

The display control function 45d displays the first image 11 described above, on the display 44. FIG. 4 is a diagram illustrating an example of the setting screen according to the first embodiment. The display control function 45d displays the setting screen 20 on the display 44 in order to allow the user to perform a variety of settings when medical image data representing a second image 11a is generated. For example, the display control function 45d displays the setting screen 20 illustrated in FIG. 4 together with the first image 11 on the display 44 every time volume rendering image data is generated by the image generating function 45b.

The setting screen 20 includes a button 21, a slider bar 22a, buttons 22b to 22e, a display region 22f, a slider bar 23a, buttons 23b to 23e, a display region 23f, a button 24a, and a display region 24b.

The button 21 is a button labeled "DISPLAY". The button 21 is a button for switching between display of the first image 11 and display of the second image 11a. For example, when the button 21 is pressed by the user through the input interface 43, the button 21 turns into a pressed state (ON state), and the image appearing on the display 44 changes from the first image 11 to the second image 11a. When the button 21 is pressed by the user again in the state in which the button 21 is pressed, the press on the button 21 is released (OFF state), and the image appearing on the display 44 changes from the second image 11a to the first image 11.

The slider bar 22a, the buttons 22b to 22e and the display region 22f are used when the above-noted first threshold is set. The first threshold corresponds to, for example, the position of the above-noted plate. This plate has planar transmittance in which the eye direction is a normal vector. That is, setting the first threshold is synonymous with setting the position of the plate. Such a plate can be moved along the eye direction.

In the present embodiment, when the first threshold is 0.00, this first threshold corresponds to the center position of three-dimensional medical image data. The user can operate the slider bar 22a and the buttons 22b to 22e through the input interface 43 to set the first threshold in a range from −1.00 or more to 1.00 or less. The first threshold set by the user appears in the display region 22f.

For example, the user can reduce the first threshold by moving the slider bar 22a in the left direction in FIG. 4. The user can increase the first threshold by moving the slider bar 22a in the right direction in FIG. 4.

The user can set the first threshold to the minimum value −1.00 by pressing the button 22b. The user can set the first threshold to the maximum value 1.00 by pressing the button 22e.

The user can reduce the first threshold by a predetermined value (for example, 0.05) every time the user presses the button 22c once. The user can increase the first threshold by a predetermined value (for example, 0.05) every time the user presses the button 22d once.

The user can set the opacity in a range greater than 0.00 to less than 1.00 by operating the slider bar 23a and the buttons 23b to 23e through the input interface 43. The opacity set by the user appears in the display region 23f.

For example, the user can reduce the opacity by moving the slider bar 23a in the left direction in FIG. 4. The user can increase the opacity by moving the slider bar 23a in the right direction in FIG. 4.

The user can set the opacity to the minimum value 0.01 by pressing the button 23b. The user can set the opacity to the maximum value 0.99 by pressing the button 23e.

The user can reduce the opacity by a predetermined value (for example, 0.01) every time the user presses the button 23c once. The user can increase the opacity by a predetermined value (for example, 0.01) every time the user presses the button 23d once.

The user can store a combination of the set first threshold and the set opacity with a name. For example, the control function 45e stores a combination of the set first threshold and the set opacity into the memory 42 in association with the name specified by the user through the input interface 43. For example, the control function 45e stores a combination of the set first threshold and the set opacity into the memory 42 in association with three-dimensional medical image data (volume data). That is, the memory 42 stores a combination of the first threshold and the opacity specified by the user in association with three-dimensional medical image data corresponding to this combination. In this way, a combination of first threshold and opacity and three-dimensional medical image data are stored into the memory 42. As used herein, three-dimensional medical image data is, for example, medical image data that is the source of volume rendering image data used when a combination of first threshold and opacity is stored. More specifically, this three-dimensional medical image data is three-dimensional medical image data serving as the source of volume rendering image data representing the first image 11 appearing on the display 44 together with the setting screen 20 used when the first threshold and the opacity are set.

The button 24a and the display region 24b are used to invoke a combination of first threshold and opacity set and stored by the user. For example, when the user presses the button 24a, a list of all the names of all the combinations of first threshold and opacity stored by the user appears on the display 44. Then, when the user selects any one name from among all the names, the selected name appears in the display region 24b. The first threshold and the opacity corresponding to the selected name appear in the display region 22f and the display region 23f, respectively. The slider bar 22a is also moved to the position depending on the first threshold corresponding to the selected name. The slider bar 23a is also moved to the position depending on the opacity corresponding to the selected name. In this way, the first threshold and the opacity invoked by the user are reset. For example, the combination of first threshold and opacity invoked by the user is reset for the three-dimensional medical image data corresponding to this combination.

When the button 21 is in the pressed state, the display control function 45d displays the second image 11a illustrated in FIG. 3 on the display 44. The display control function 45d is an example of the display control unit. For example, in the second image 11a illustrated in FIG. 3, the portion 12a is more blended in the background 14 than the portion 12b. The portion 13a is more blended in the background 14 than the portion 13b. The user therefore can grasp that the portion 12a is on the back side compared with the portion 12b. The user also can grasp that the portion 13a is on the back side compared with the portion 13b. The medical image processing apparatus 4 according to the first embodiment therefore can allow the user to grasp the positional relation in the depth direction of a plurality of portions of the pulmonary artery 12 and a plurality of portions of the pulmonary vein 13.

The user can rotate or move the pulmonary artery 12 and the pulmonary vein 13 rendered in the first image 11 through the input interface 43. For example, the image generating function 45b rotates the pulmonary artery 12 and the pulmonary vein 13 in accordance with the amount of rotation specified by the user through the input interface 43. The image generating function 45b moves the pulmonary artery 12 and the pulmonary vein 13 in accordance with the amount of movement specified by the user through the input interface 43. Specifically, the image generating function 45b resets the eye point and the eye direction in three-dimensional medical image data, based on the amount of rotation and the amount of movement specified by the user. The image generating function 45b then performs volume rendering again on three-dimensional medical image data, based on the reset eye point and eye direction, to generate volume rendering image data again.

Figure 5:
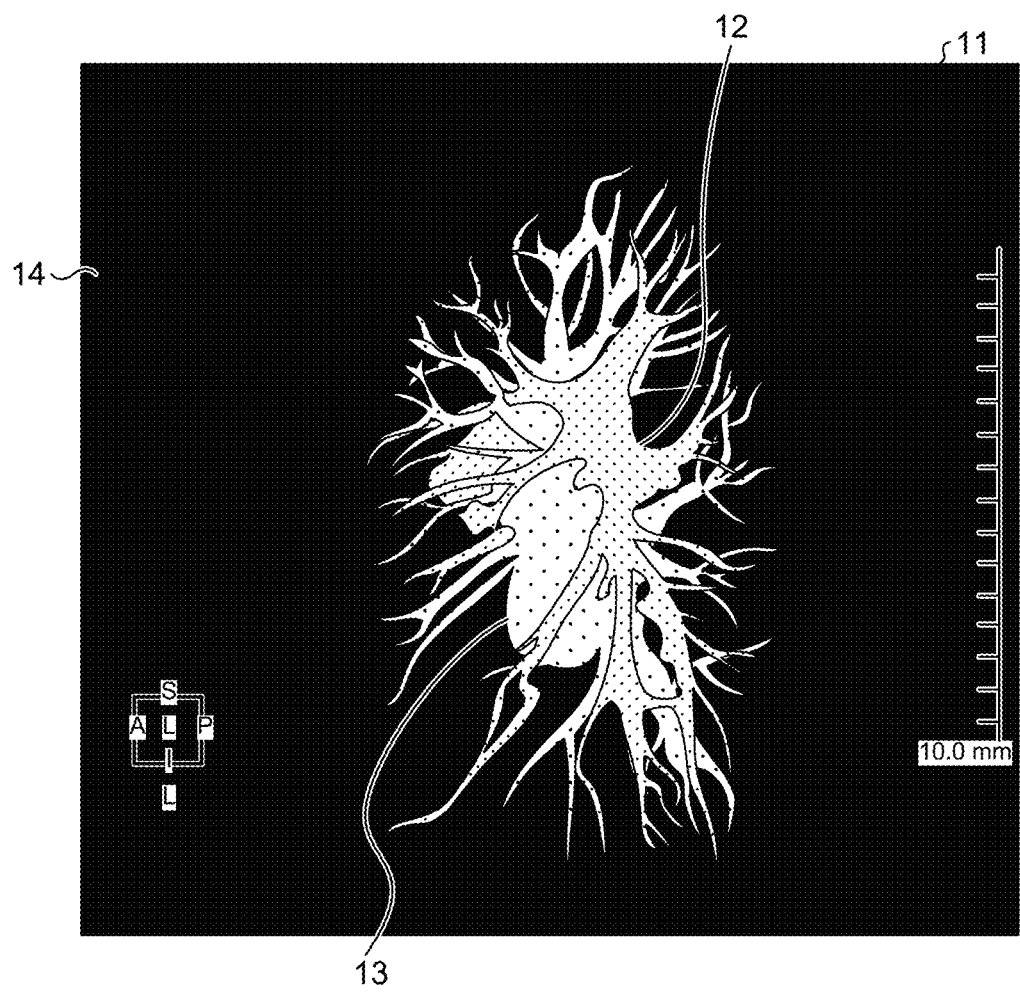
FIG. 5 is a diagram illustrating an example of the first image according to the first embodiment.

FIG. 5 is a diagram illustrating an example of the first image according to the first embodiment. For example, the image generating function 45b rotates the pulmonary artery 12 and the pulmonary vein 13 illustrated in FIG. 2 in accordance with the amount of rotation specified by the user. The image generating function 45b moves the pulmonary artery 12 and the pulmonary vein 13 illustrated in FIG. 2 in accordance with the amount of movement specified by the user. The image generating function 45b then generates volume rendering image data representing the first image 11 (see FIG. 5) in which the rotated and moved pulmonary artery 12 and pulmonary vein 13 is rendered. In this case, the image generating function 45b calculates depth information again for each of all the pixels that constitute the first image 11 illustrated in FIG. 5.

Figure 6:
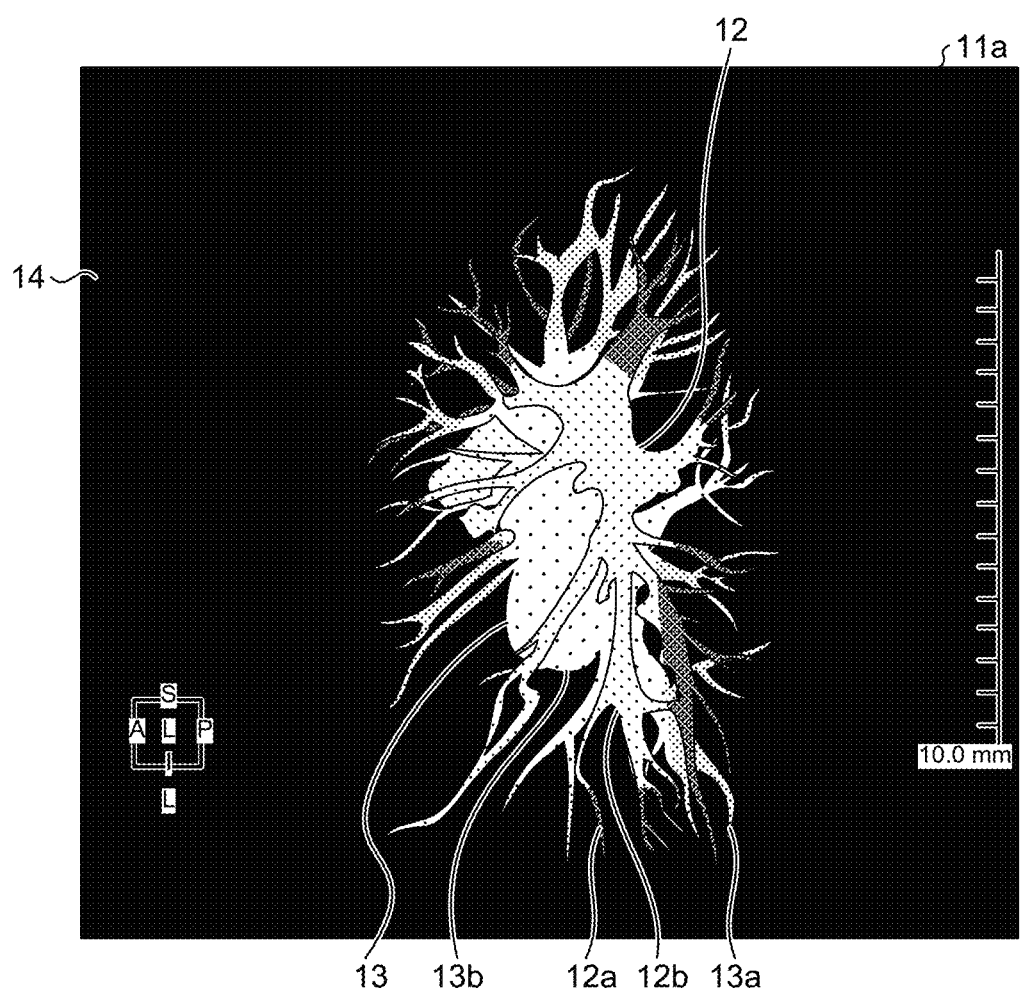
FIG. 6 is a diagram illustrating an example of medical image data generated by the image processing function according to the first embodiment.

FIG. 6 is a diagram illustrating an example of medical image data generated by the image processing function according to the first embodiment. For example, the image processing function 45c generates medical image data representing the second image 11a illustrated in FIG. 6, from the volume rendering image data representing the first image 11 in FIG. 5, based on the depth information calculated again. When the button 21 is in the pressed state, the display control function 45d displays the second image 11a illustrated in FIG. 6 on the display 44.

Figure 7:
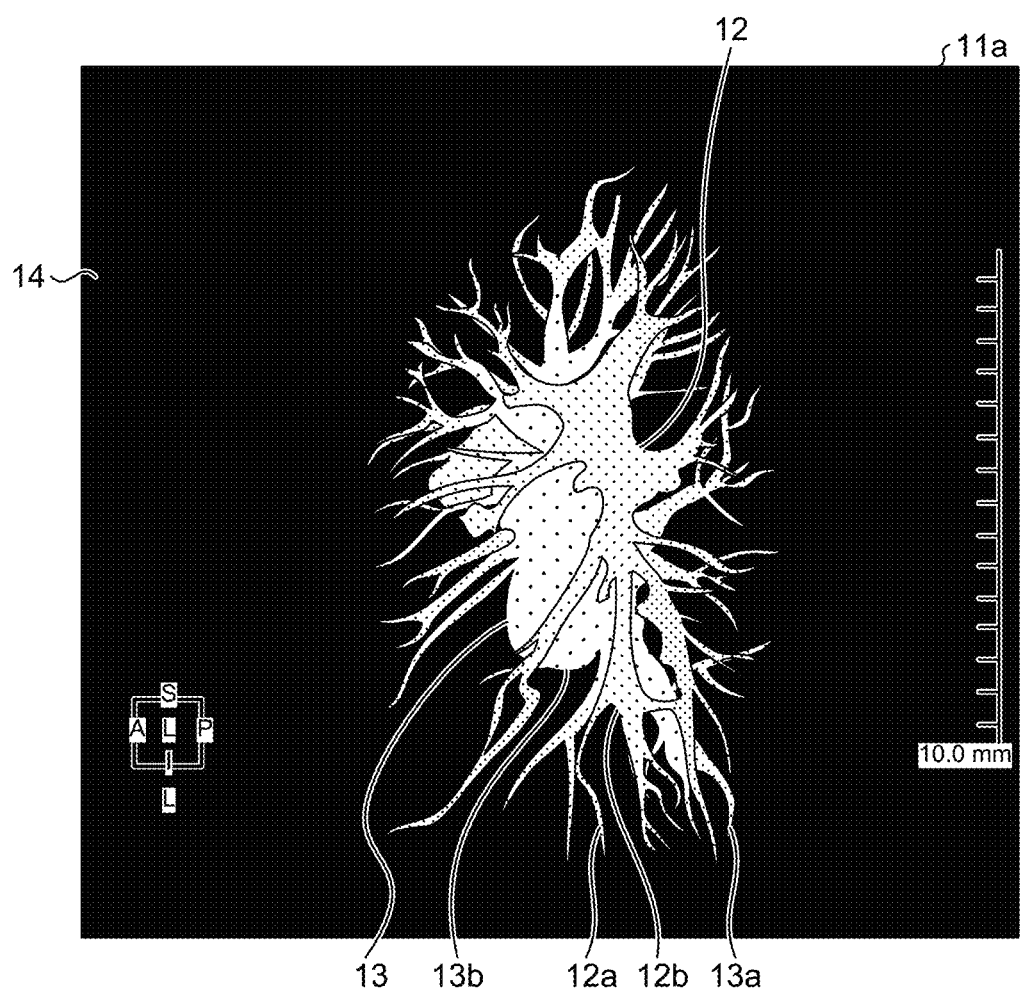
FIG. 7 is a diagram illustrating an example of medical image data generated by the image processing function according to the first embodiment before opacity is changed.
Figure 8:
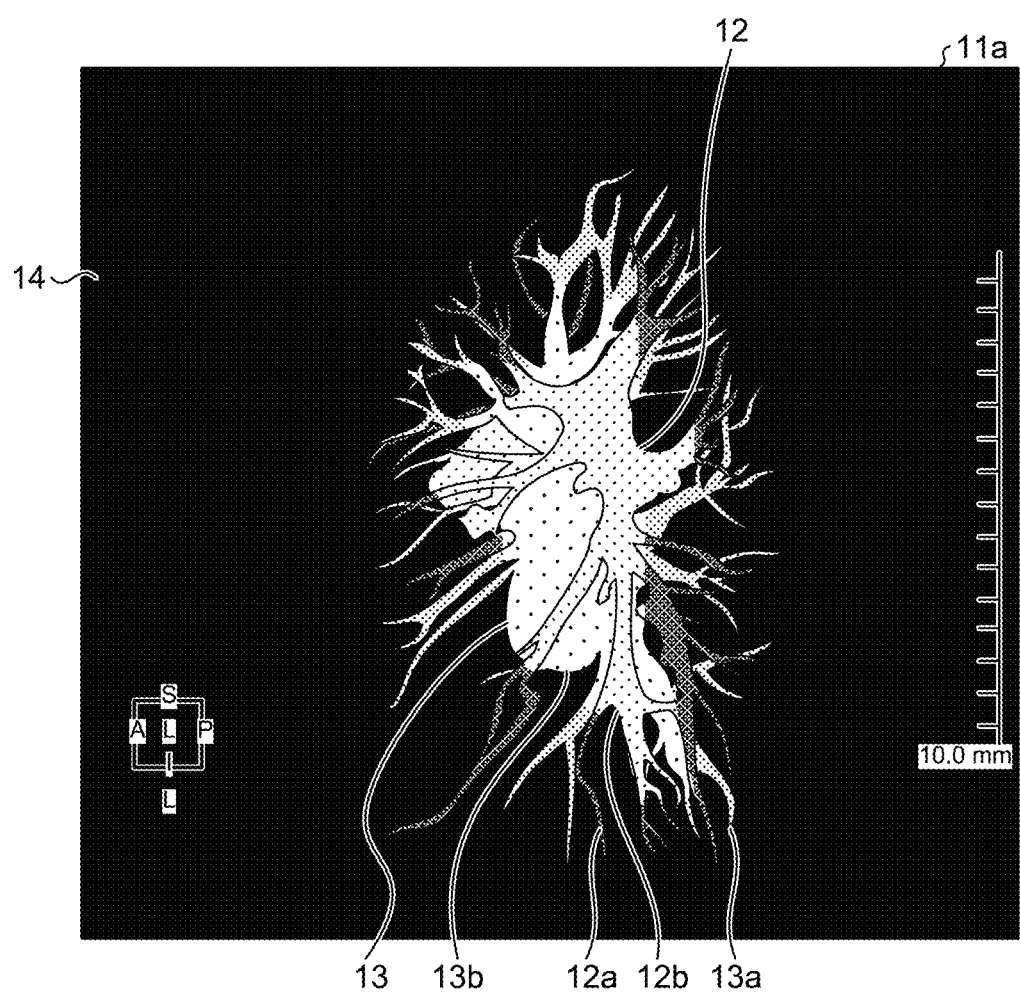
FIG. 8 is a diagram illustrating an example of medical image data generated by the image processing function according to the first embodiment after opacity is changed.

The user can change the opacity by operating the slider bar 23a, for example, in a state in which the second image 11a appears on the display 44. For example, a case where the user changes the opacity from 0.30 to 0.70 will be described. FIG. 7 is a diagram illustrating an example of medical image data generated by the image processing function according to the first embodiment before opacity is changed. FIG. 8 is a diagram illustrating an example of medical image data generated by the image processing function according to the first embodiment after opacity is changed. For example, when the opacity set by the user is 0.30, the image processing function 45c generates medical image data representing the second image 11a illustrated in FIG. 7, using image data for composition with opacity of 0.30.

When the user changes the opacity from 0.30 to 0.70, the image processing function 45c generates medical image data representing the second image 11a illustrated in FIG. 8 using image data for composition with opacity of 0.70.

Figure 9:
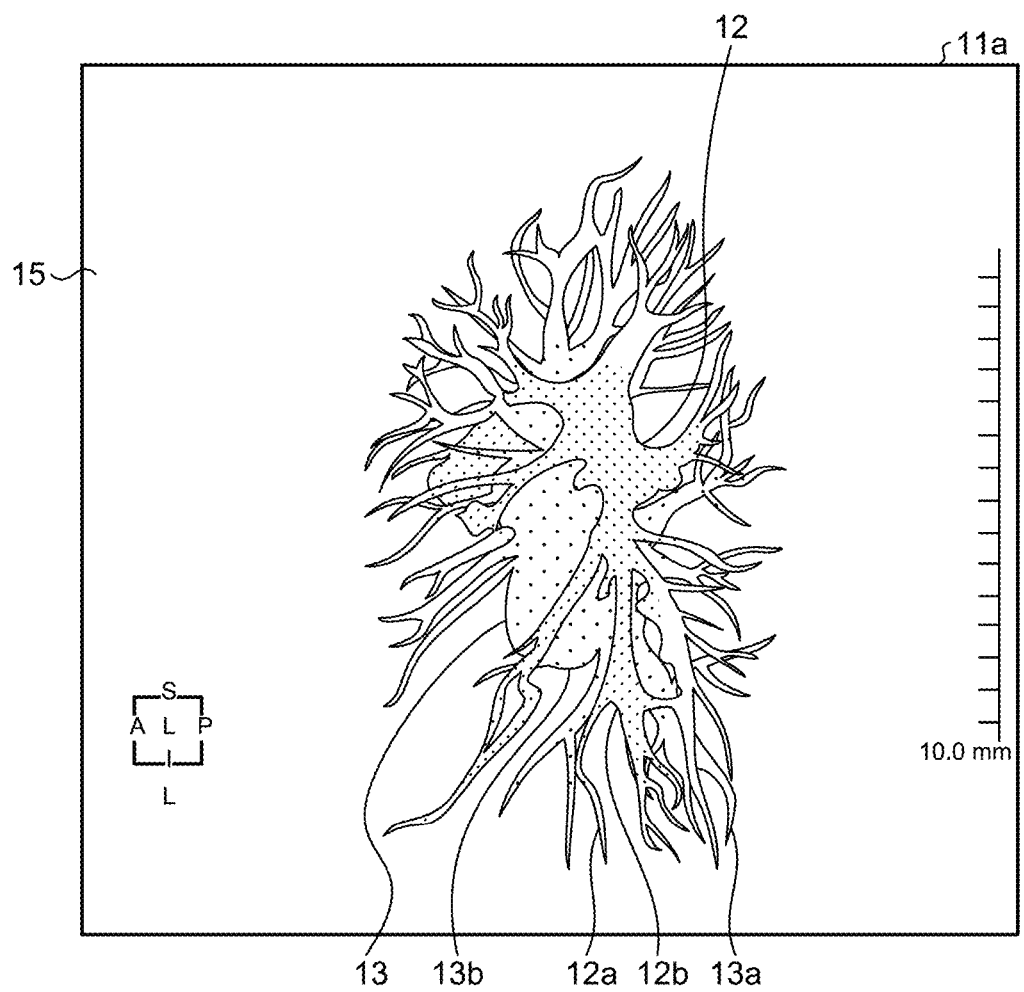
FIG. 9 is a diagram illustrating an example of image data generated by the image processing function according to the first embodiment when the background is changed to white.

The user can also change the color of the background 14 of the second image 11a through the input interface 43. For example, a case where the user changes the background 14 of the second image 11a illustrated in FIG. 7 from black to white will be described. In this case, with the change in color of the background 14, the image processing function 45c changes the color allocated to image data for composition from black to white. The image processing function 45c then generates medical image data representing the second image 11a illustrated in FIG. 9 using the image data for composition changed to white. That is, when the color of the background is changed, the image processing function 45c generates medical image data representing the second image 11a (see FIG. 9) by combining data of pixels with depth information equal to or greater than the first threshold with image data for composition to which the same color as the changed color of the background is allocated. FIG. 9 is a diagram illustrating an example of medical image data generated by the image processing function according to the first embodiment when the background is changed to white.

For example, in the second image 11a illustrated in FIG. 9, the portion 12a is more blended in a white background 15 than the portion 12b. The portion 13a is more blended in the white background 15 than the portion 13b.

Figure 10:
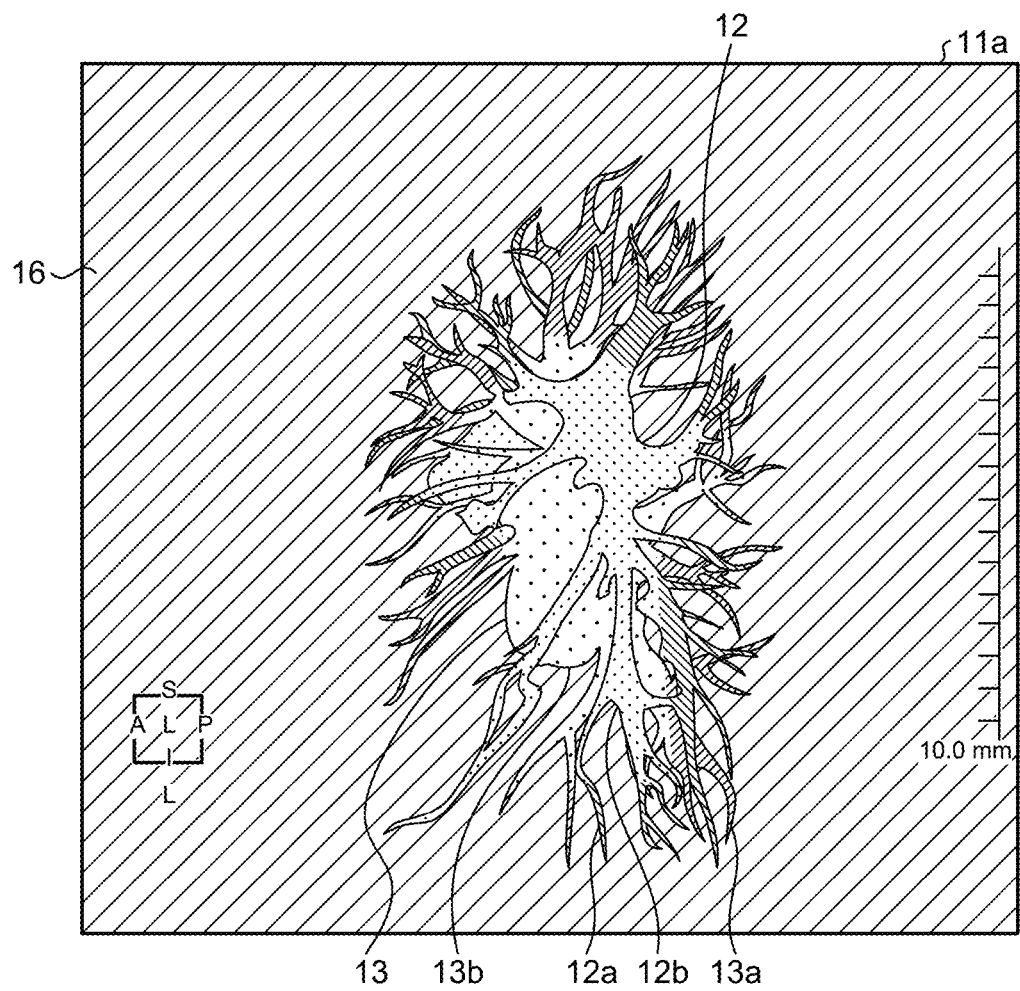
FIG. 10 is a diagram illustrating an example of medical image data generated by the image processing function according to the first embodiment when the background is changed to yellow.

A case where the user changes the background 14 of the second image 11a illustrated in FIG. 7 from black to yellow will be described. In this case, with the change in color of the background 14, the image processing function 45c changes the color allocated to image data for composition from black to yellow. The image processing function 45c then generates medical image data representing the second image 11a illustrated in FIG. 10, using the image data for composition changed to yellow. FIG. 10 is a diagram illustrating an example of medical image data generated by the image processing function according to the first embodiment when the background is changed to yellow.

For example, in the second image 11a illustrated in FIG. 10, the portion 12a is more blended in a yellow background 16 than the portion 12b. The portion 13a is more blended in the yellow background 16 than the portion 13b.

The medical image processing apparatus 4 according to the first embodiment therefore can allow the user to grasp the positional relation in the depth direction of a plurality of portions of the pulmonary artery 12 and a plurality of portions of the pulmonary vein 13 even when the color of the background is changed.

Figure 11:
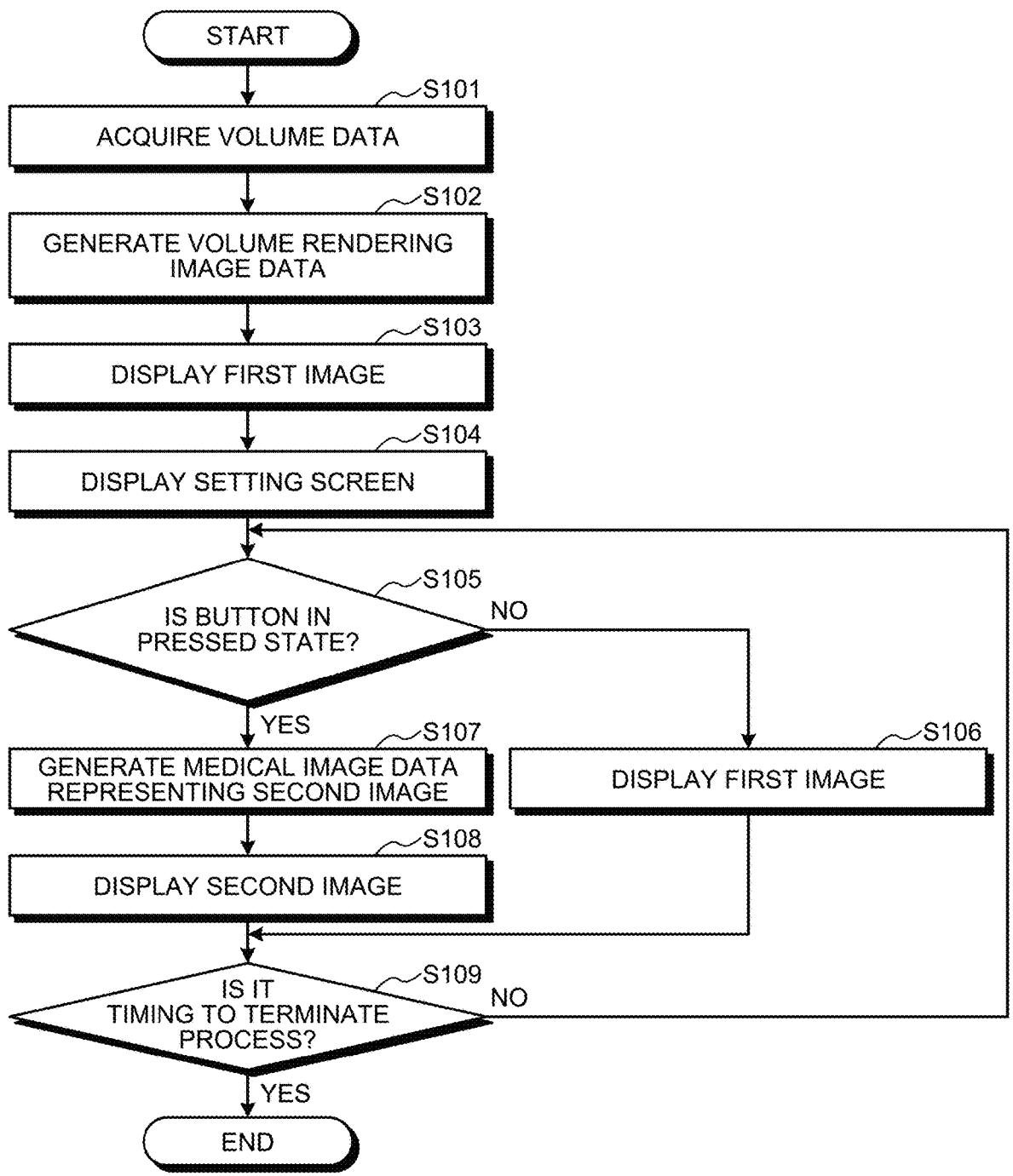
FIG. 11 is a flowchart illustrating an example of the process performed by a medical image processing apparatus according to the first embodiment.

FIG. 11 is a flowchart illustrating an example of the process performed by the medical image processing apparatus according to the first embodiment. The process illustrated in FIG. 11 is performed, for example, when the medical image processing apparatus 4 accepts an instruction for performing the process illustrated in FIG. 11 from the user through the input interface 43.

As illustrated in FIG. 11, the acquisition function 45a acquires three-dimensional medical image data (volume data) stored in the memory 42 (step S101). The image generating function 45b then generates volume rendering image data by setting an eye point and an eye direction and performing volume rendering on the three-dimensional medical image data (step S102).

The display control function 45d then displays the first image 11 represented by the volume rendering image data on the display 44 (step S103). The display control function 45d displays the setting screen 20 on the display 44 (step S104).

The control function 45e then determines whether the button 21 is in the pressed state (step S105). If the button 21 is not in the pressed state, that is, if the press on the button 21 is in the released state (No at step S105), the display control function 45d displays the first image 11 on the display 44 (step S106). The display control function 45d then proceeds to step S109.

On the other hand, if the button 21 is in the pressed state (Yes at step S105), the image processing function 45c generates medical image data representing the second image 11a that enables the user to easily grasp the positional relation in the depth direction of a plurality of portions of a structure (step S107). The display control function 45d then displays the second image 11a on the display 44 (step S108).

The control function 45e then determines whether it is the timing to terminate the process illustrated in FIG. 11 (step S109). For example, at step S109, the control function 45e determines whether an instruction to terminate the process illustrated in FIG. 11 has been received from the user through the input interface 43. If an instruction to terminate the process illustrated in FIG. 11 has been received, the control function 45e determines that it is the timing to terminate the process illustrated in FIG. 11. On the other hand, if an instruction to terminate the process illustrated in FIG. 11 has not been received, the control function 45e determines that it is not the timing to terminate the process illustrated in FIG. 11.

If it is not the timing to terminate the process illustrated in FIG. 11 (No at step S109), the control function 45e returns to step S105. On the other hand, if it is the timing to terminate the process illustrated in FIG. 11 (Yes at step S109), the control function 45e terminates the process.

The medical image processing apparatus 4 according to the first embodiment has been described above. The medical image processing apparatus 4 according to the first embodiment can allow the user to easily grasp the positional relation in the depth direction of a plurality of portions of the pulmonary artery 12 and a plurality of portions of the pulmonary vein 13.

First Modification to First Embodiment

The image processing function 45c may change the opacity of image data for composition, based on depth information. Such an embodiment is described as a first modification to the first embodiment.

In the first modification to the first embodiment, the differences from the first embodiment are mainly described, and a description of a configuration and a process similar to the first embodiment may be omitted.

For example, in the first modification to the first embodiment, the image processing function 45c generates medical image data representing the second image 11a in FIG. 3, in the same manner as in the first embodiment. Specifically, the image processing function 45c generates medical image data representing the second image 11a by combining pixel data with image data for composition, pixel by pixel, for the pixels with depth information equal to or greater than the first threshold, in volume rendering image data.

However, in the first modification to the first embodiment, the image processing function 45c changes the opacity such that the opacity of image data for composition increases as the depth information corresponding to a pixel increases, pixel by pixel, for the pixels with depth information equal to or greater than the first threshold. The image processing function 45c then generates medical image data representing the second image 11a, using the image data for composition with the changed opacity, pixel by pixel. With this process, the color allocated to a pixel with depth information equal to or greater than the first threshold changes so as to come closer to the color of the background 14 (see FIG. 3) as the depth information increases. That is, the allocated color gradually changes from a pixel with the smallest depth information to a pixel with the largest depth information in a plurality of pixels with depth information equal to or greater than the first threshold. In this way, the image processing function 45c changes the opacity of image data for composition, based on the depth information. The image processing function 45c then generates medical image data representing the second image 11a, using image data for composition having opacity depending on the depth information. That is, the image processing function 45c generates medical image data representing the second image 11a by combining data of a pixel with depth information equal to or greater than the first threshold with image data for composition having opacity depending on depth information. The medical image processing apparatus 4 according to the first modification to the first embodiment therefore can allow the user to grasp the positional relation in the depth direction of a plurality of portions of the pulmonary artery 12 and a plurality of portions of the pulmonary vein 13 in more detail.

Second Modification to First Embodiment

The image processing function 45c may generate medical image data representing the second image 11a in FIG. 3 by a method different from the first embodiment. Such an embodiment is described as a second modification to the first embodiment.

In the second modification to the first embodiment, the differences from the first embodiment are mainly described, and a description of a configuration and a process similar to the first embodiment may be omitted.

An example of the method of generating medical image data representing the second image 11a according to the second modification to the first embodiment will be described. For example, in the second modification to the first embodiment, the image processing function 45c generates composite image data of one pixel by combining pixel data with image data for composition, pixel by pixel, for pixels with depth information equal to or greater than the first threshold.

The image processing function 45c then generates medical image data representing the second image 11a in FIG. 3 by replacing pixel data with composite image data, for pixels with depth information equal to or greater than the first threshold, in volume rendering image data.

The medical image processing apparatus 4 according to the second modification to the first embodiment has been described above. The medical image processing apparatus 4 according to the second modification to the first embodiment can allow the user to easily grasp the positional relation in the depth direction of a plurality of portions of the pulmonary artery 12 and a plurality of portions of the pulmonary vein 13, in the same manner as in the first embodiment.

Third Modification to First Embodiment

The image processing function 45c may generate medical image data represented by the second image, using a combination of first threshold and opacity stored in the memory 42. Such an embodiment is described as a third modification to the first embodiment.

In the third modification to the first embodiment, the differences from the first embodiment are mainly described, and a description of a configuration and a process similar to the first embodiment may be omitted.

For example, in the third modification to the first embodiment, when the user presses the button 24a on the setting screen 20 appearing on the display 44, the display control function 45d displays a list of all the names of all the combinations of first threshold and opacity stored in the memory 42 on the display 44. When one name is selected by the user from the list of names appearing on the display 44, the acquisition function 45a acquires a combination of first threshold and opacity corresponding to the selected name from the memory 42. The acquisition function 45a acquires three-dimensional medical image data associated with the obtained combination of first threshold and opacity from the memory 42. The three-dimensional medical image data acquired by the acquisition function 45a is three-dimensional medical image data serving as the source of volume rendering image data representing the first image 11 appearing on the display 44 together with the setting screen 20. In the following description, this three-dimensional medical image data may be denoted as "three-dimensional source medical image data".

When the user performs an operation on the setting screen 20 to change the first threshold and the opacity acquired by the acquisition function 45a, the image processing function 45c generates medical image data representing the second image again, using the changed first threshold and image data for composition having the changed opacity. Specifically, when the first threshold and the opacity are changed by the user, the image generating function 45b sets an eye point and an eye direction in the three-dimensional medical image data acquired by the acquisition function 45a and generates volume rendering image data representing the first image. That is, the image generating function 45b generates volume rendering image data from the acquired three-dimensional medical image data. The image processing function 45c then generates medical image data representing the second image from the volume rendering image data generated by the image generating function 45b, using the changed first threshold and image data for composition having the changed opacity. In this way, the image processing function 45c generates medical image data representing the second image, using the stored combination of first threshold and opacity as a template. Not only when both of the first threshold and the opacity are changed but also when one of the first threshold and the opacity is changed, medical image data representing the second image may be generated by a similar method.

When the user does not change the first threshold or the opacity acquired by the acquisition function 45a, first, the image generating function 45b generates volume rendering image data representing the first image from the three-dimensional medical image data acquired by the acquisition function 45a, in the same manner as when the first threshold and the opacity are changed. The image processing function 45c then generates medical image data representing the second image from the volume rendering image data generated by the image generating function 45b, using the first threshold acquired by the acquisition function 45a and image data for composition having the opacity acquired by the acquisition function 45a.

Fourth Modification to First Embodiment

In the third modification to the first embodiment, the medical image processing apparatus 4 generates medical image data representing the second image from three-dimensional source medical image data, using the stored combination of first threshold and opacity. However, the medical image processing apparatus 4 may generate medical image data representing the second image from another three-dimensional medical image data, using the stored combination of first threshold and opacity. Such an embodiment is described as a fourth modification to the first embodiment.

In the fourth modification to the first embodiment, the differences from the third modification to the first embodiment are mainly described, and a description of a configuration and a process similar to the third modification to the first embodiment may be omitted.

For example, in the fourth modification to the first embodiment, the medical image processing apparatus 4 generates medical image data representing the second image from another three-dimensional medical image data, using the stored combination of first threshold and opacity as a template, in the same manner as in the third modification to the first embodiment. As used herein, another three-dimensional medical image data is, for example, medical image data different from the above-noted three-dimensional source medical image data. Another three-dimensional medical image data is stored in the memory 42 and acquired from the memory 42 by the acquisition function 45a.

Here, the stored combination of first threshold and opacity may be unable to be used versatilely. For example, when a site (an imaging target or a site to be imaged) rendered in the three-dimensional source medical image data has a complicated shape, the shape of the site varies widely from person to person. In this case, the stored combination of first threshold and opacity may be unable to be used versatilely.

When the size of the rendered site varies widely according to the body type, age, etc. of subjects, the stored combination of first threshold and opacity may also be unable to be used versatilely.

The user then determines whether the stored combination of first threshold and opacity is able to be used versatilely. In the fourth modification to the first embodiment, when the user determines that the stored combination of first threshold and opacity is able to be used versatilely, the user inputs information indicating that the stored combination is able to be used versatilely (for example, "1") to the processing circuitry 45 through the input interface 43. The control function 45e then stores information indicating that the stored combination is able to be used versatilely into the memory 42 in association with the combination of first threshold and opacity stored in the memory 42.

When the user determines that the stored combination of first threshold and opacity is unable to be used versatilely, the user inputs information indicating that the stored combination is unable to be used versatilely (for example, "0") to the processing circuitry 45 through the input interface 43. The control function 45e then stores information indicating that the stored combination is unable to be used versatilely into the memory 42 in association with the combination of first threshold and opacity stored in the memory 42.

In this way, in the fourth modification to the first embodiment, the memory 42 stores a combination of first threshold and opacity in association with information indicating that whether the combination of first threshold and opacity is able to be used versatilely.

In the fourth modification to the first embodiment, the acquisition function 45a acquires information indicating that a combination of first threshold and opacity is able to be used versatilely, from the memory 42. When the information acquired by the acquisition function 45a indicates that the combination of first threshold and opacity is able to be used versatilely, the medical image processing apparatus 4 performs the following process. For example, the medical image processing apparatus 4 generates medical image data representing the second image from another three-dimensional medical image data, using the stored combination of first threshold and opacity as a template, in the same manner as in the third modification to the first embodiment.

On the other hand, when the information acquired by the acquisition function 45a indicates that the combination of first threshold and opacity is unable to be used versatilely, the medical image processing apparatus 4 does not perform the process of generating medical image data representing the second image from another three-dimensional medical image data.

The medical image processing apparatus 4 according to the fourth modification to the first embodiment has been described above. According to the fourth modification of the first embodiment, when medical image data representing the second image is generated from another three-dimensional medical image data, the determination as to whether the stored combination of first threshold and opacity can be used as a template is performed appropriately. According to the fourth modification to the first embodiment, therefore, an appropriate stored combination of first threshold and opacity can be used as a template.

Fifth Modification to First Embodiment

In the fourth modification to the first embodiment, the medical image processing apparatus 4 generates medical image data representing the second image from another three-dimensional medical image data, using the stored combination of first threshold and opacity. Here, the size S1 in real space of a voxel of three-dimensional source medical image data may be different from the size S2 in real space of a voxel of another three-dimensional medical image data. As used herein, the size S, S2 is, for example, the length in real space corresponding to the length of a side of a voxel. The size S1 is an example of the first size. The size S2 is an example of the second size.

For example, a case where the site rendered in three-dimensional source medical image data is an adult heart and the site rendered in another three-dimensional medical image data is a child's heart will be described. In this case, for example, an adult heart tends to be bigger than a child's heart. Three-dimensional medical image data is collected, for example, after the imaging range is set such that sites other than heart are included as little as possible. The above-noted size S1 therefore tends to be bigger than the size S2.

For example, a case where a site rendered in three-dimensional source medical image data is a kidney having a disease such as kidney cyst and a site rendered in another three-dimensional medical image data is a kidney having no disease will be described. In this case, for example, a kidney having a disease tends to be bigger than a kidney having no disease. The above-noted size S1 therefore tends to be bigger than the size S2.

A description will be given for a case where when the size S1 and the size S2 are different in this way, the medical image processing apparatus 4 generates medical image data representing the second image from another three-dimensional medical image data using the stored combination of first threshold and opacity, in the same manner as in the fourth modification to the first embodiment. In this case, the first threshold is not necessarily appropriate on another three-dimensional medical image data. For example, the distance from the eye point corresponding to the first threshold differs between three-dimensional source medical image data and another three-dimensional medical image data in real space. The first threshold therefore is not necessarily appropriate on another three-dimensional medical image data.

Then, when the medical image processing apparatus 4 generates medical image data representing the second image in the same manner as in the fourth modification to the first embodiment, the image processing function 45c corrects the first threshold. For example, as expressed by the following expression (1), the image processing function 45c generates a new first threshold Th1' by multiplying the stored first threshold Th1 by (S2/S1).

$$Th1'=Th1\times(S2/S1) \quad (1)$$

The image processing function 45c then generates medical image data representing the second image from volume rendering image data generated from another three-dimensional medical image data, in the same manner as in the fourth modification to the first embodiment, using the new first threshold Th1'. That is, the image processing function 45c corrects the first threshold Th1 based on the size S1 and the size S2 and generates medical image data representing the second image using the corrected first threshold Th1'.

Here, a distance d1 obtained by converting the distance from the eye point corresponding to the first threshold Th1 in the three-dimensional source medical image data in terms of real pace substantially agrees with a distance d2 obtained by converting the distance from the eye point corresponding to the first threshold Th1' in another three-dimensional medical image data in terms of real space. According to the fifth modification to the first embodiment, therefore, the first threshold Th1' is an appropriate value on another three-dimensional medical image data.

The medical image processing apparatus 4 according to the fifth modification to the first embodiment has been described above. According to the fifth modification to the first embodiment, the first threshold can be corrected to an appropriate value as described above. As a result, an appropriate second image can be obtained.

Second Embodiment

In the foregoing embodiment, the position of the plate (first threshold) is set through the setting screen 20 appearing on the display 44. However, the display control function 45d may display a reference image with a mark superimposed thereon to indicate a plate, at a position corresponding to the position of the plate set through the setting screen 20, together with the setting screen 20 on the display 44. Such an embodiment is described as the second embodiment.

In the second embodiment, the differences from the first embodiment are mainly described, and a description of a configuration and a process similar to the first embodiment may be omitted. In the second embodiment, a configuration similar to the first embodiment is denoted by the same reference sign as in the foregoing embodiment, and a description thereof may be omitted.

Figure 12:
FIG. 12 is a diagram illustrating an example of a reference image according to a second embodiment.
Figure 13:
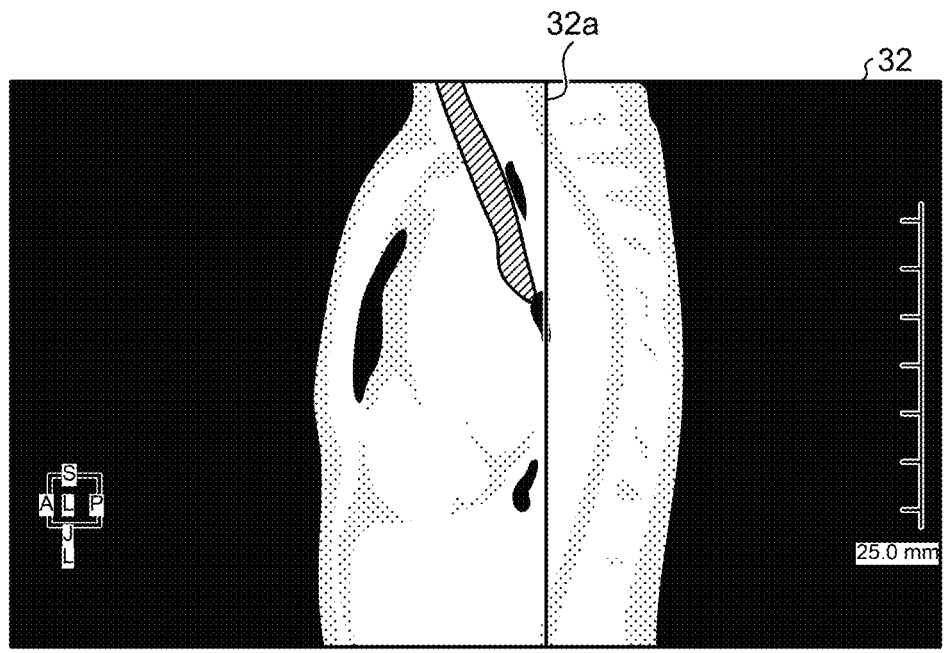
FIG. 13 is a diagram illustrating an example of the reference image according to the second embodiment.
Figure 14:
FIG. 14 is a diagram illustrating an example of the reference image according to the second embodiment.

FIG. 12 to FIG. 14 are diagrams illustrating an example of the reference image according to the second embodiment. FIG. 12 illustrates an axial cross-section image 31 that is an example of the reference image. In the second embodiment, the image generating function 45b performs a multi-planar reconstruction (MPR) process on three-dimensional medical image data to generate reference image data representing an axial cross-section image 31 in which a part of the pulmonary artery and a part of the pulmonary vein are rendered. The image generating function 45b generates superimposed image data in which a mark 31a indicating a plate is superimposed at a position in the axial cross-section image 31 corresponding to the position of the plate (first threshold) set through the setting screen 20.

FIG. 13 illustrates a sagittal cross-section image 32 that is an example of the reference image. In the second embodiment, the image generating function 45b performs a MPR process on three-dimensional medical image data to generate reference image data representing a sagittal cross-section image 32 in which a part of the pulmonary artery and a part of the pulmonary vein are rendered. The image generating function 45b generates superimposed image data in which a mark 32a indicating a plate is superimposed at a position in the sagittal cross-section image 32 corresponding to the position of the plate set through the setting screen 20.

FIG. 14 illustrates a coronal cross-section image 33 that is an example of the reference image. In the second embodiment, the image generating function 45b performs a MPR process on three-dimensional medical image data to generate reference image data representing a coronal cross-section image 33 in which a part of the pulmonary artery and a part of the pulmonary vein are rendered. The image generating function 45b generates superimposed image data in which a mark 33a indicating a plate is superimposed at a position in the coronal cross-section image 33 corresponding to the position of the plate set through the setting screen 20. In the example in FIG. 14, the plate indicated by the mark 33a is parallel to the coronal cross-section. The plate indicated by the mark 31a, the plate indicated by the mark 32a, and the plate indicated by the mark 33a refer to the same plate.

Here, three marks 31a, 32a, and 33a indicate the first threshold. Three marks 31a, 32a, and 33a are boundary information indicating the boundary between the back-side portion 12a and the front-side portion 12b of the pulmonary artery 12. Three marks 31a, 32a, and 33a are boundary information indicating the boundary between the back-side portion 13a and the front-side portion 13b of the pulmonary vein 13.

The display control function 45d then displays a superimposed image represented by a variety of superimposed image data, together with the setting screen 20, on the display 44. Specifically, the display control function 45d displays the axial cross-section image 31 with the mark 31a superimposed thereon, the sagittal cross-section image 32 with the mark 32a superimposed thereon, and the coronal cross-section image 33 with the mark 33a superimposed thereon, as superimposed images on the display 44. With this configuration, the user can easily grasp the boundary between the back-side portion 12a and the front-side portion 12b of the pulmonary artery 12 and the boundary between the back-side portion 13a and the front-side portion 13b of the pulmonary vein 13.

Here, the position of the mark 31a on the axial cross-section image 31 changes in conjunction with change in position of the plate set through the setting screen 20. Similarly, the position of the mark 32a on the sagittal cross-section image 32 changes in conjunction with change in position of the plate set through the setting screen 20. Similarly, the position of the mark 33a on the coronal cross-section image 33 changes in conjunction with change in position of the plate set through the setting screen 20.

That is, the setting screen 20 is a screen for accepting the first threshold and the opacity set by the user. The image generating function 45b then generates superimposed image data in which the mark 31a is superimposed at a position on the axial cross-section image 31 corresponding to the first threshold accepted through the setting screen 20.

The image generating function 45b generates superimposed image data in which the mark 32a is superimposed at a position on the sagittal cross-section image 32 corresponding to the first threshold accepted through the setting screen 20. The image generating function 45b generates superimposed image data in which the mark 33a is superimposed at a position on the coronal cross-section image 33 corresponding to the first threshold accepted through the setting screen 20.

In this way, the image generating function 45b changes the position of the mark 31a on the axial cross-section image 31 in accordance with change in position of the plate set through the setting screen 20. The image generating function 45b also changes the position of the mark 32a on the sagittal cross-section image 32 in accordance with change in position of the plate set through the setting screen 20. The image generating function 45b also changes the position of the mark 33a on the coronal cross-section image 33 in accordance with change in position of the plate set through the setting screen 20.

The user can move the respective positions (the positions on the cross-section images) of three marks 31a, 32a, and 33a, using a cursor appearing on the axial cross-section image 31, the sagittal cross-section image 32, and the coronal cross-section image 33, through the input interface 43. The user may change the position of the plate (first threshold) by changing the position of any one of three marks 31a, 32a, and 33a through the input interface 43. In this case, the position of the slider bar 22a on the setting screen 20 and the first threshold displayed in the display region 22f are changed in conjunction with change in position of the plate. In this case, the image processing function 45c generates medical image data representing the second image that can allow the user to easily grasp the positional relation in the depth direction of a plurality of portions of a structure, using the first threshold changed in conjunction with change in position of the plate. When the position of any one of three marks 31a, 32a, and 33a is changed, the positions of the other marks are also changed.

The medical image processing apparatus 4 according to the second embodiment has been described above. The medical image processing apparatus 4 according to the second embodiment can allow the user to easily grasp the boundary between the back-side portion 12a and the front-side portion 12b of the pulmonary artery 12 and the boundary between the back-side portion 13a and the front-side portion 13b of the pulmonary vein 13. The medical image processing apparatus 4 according to the second embodiment can allow the user to grasp the positional relation in the depth direction of a plurality of portions of the pulmonary artery 12 and a plurality of portions of the pulmonary vein 13, in the same manner as in the first embodiment.

Third Embodiment

Figure 15:
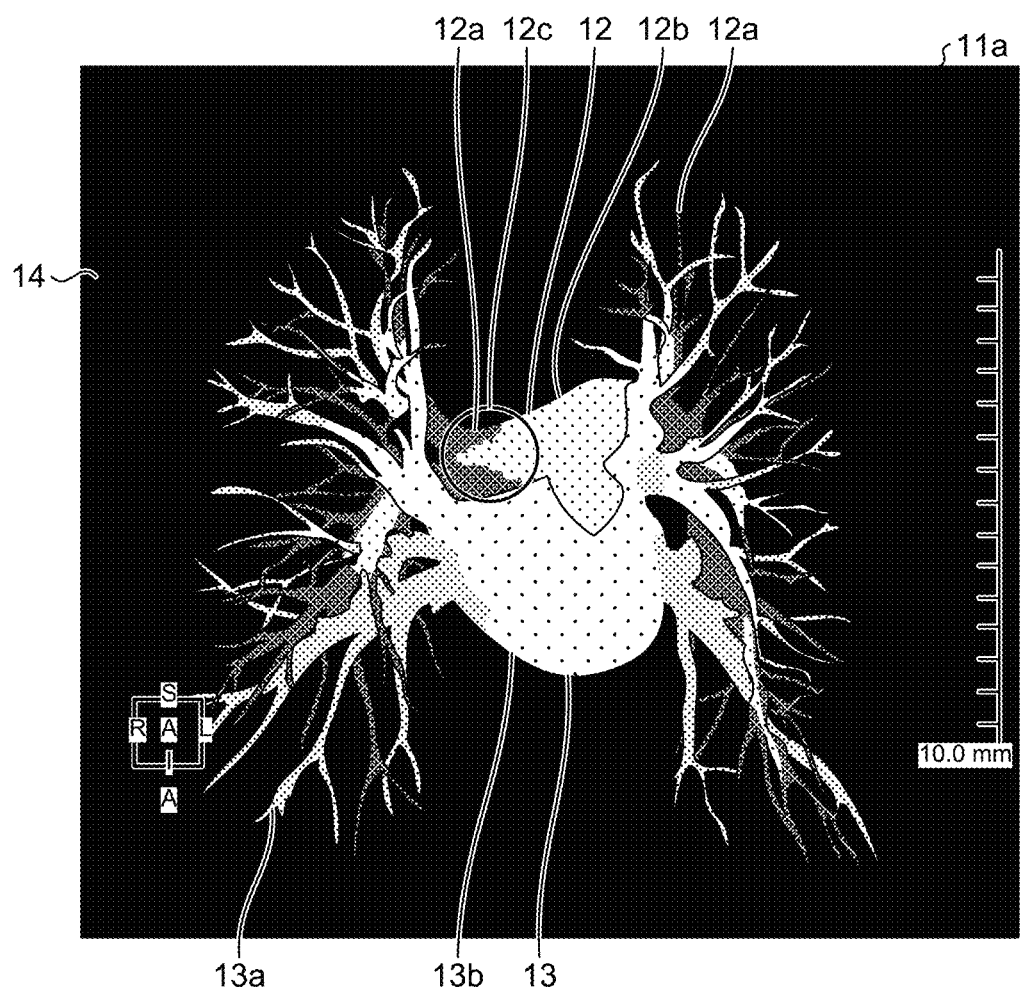
FIG. 15 is a diagram illustrating an example of the boundary between a back-side portion and a front-side portion of a pulmonary artery.

FIG. 15 is a diagram illustrating an example of the boundary between the back-side portion 12a and the front-side portion 12b of the pulmonary artery 12. When the image processing function 45c uses the depth information generated by the image generating function 45b as it is without processing, the boundary between the back-side portion 12a and the front-side portion 12b of the pulmonary artery 12 may be rough rather than being smooth, as illustrated in a circular region 12c in FIG. 15. Similarly, the boundary between the back-side portion 13a and the front-side portion 13b of the pulmonary vein 13 may be rough rather than being smooth.

In order to suppress occurrence of such roughness, the image processing function 45c may process the depth information generated by the image generating function 45b. For example, the image processing function 45c may smooth the depth information generated by the image generating function 45b. Such an embodiment is described as a third embodiment.

In the third embodiment, the differences from the foregoing embodiments are mainly described, and a description of a configuration and a process similar to the foregoing embodiments may be omitted. In the third embodiment, a configuration similar to the foregoing embodiment is denoted by the same reference sign as in the foregoing embodiment, and a description thereof may be omitted.

Figure 16:
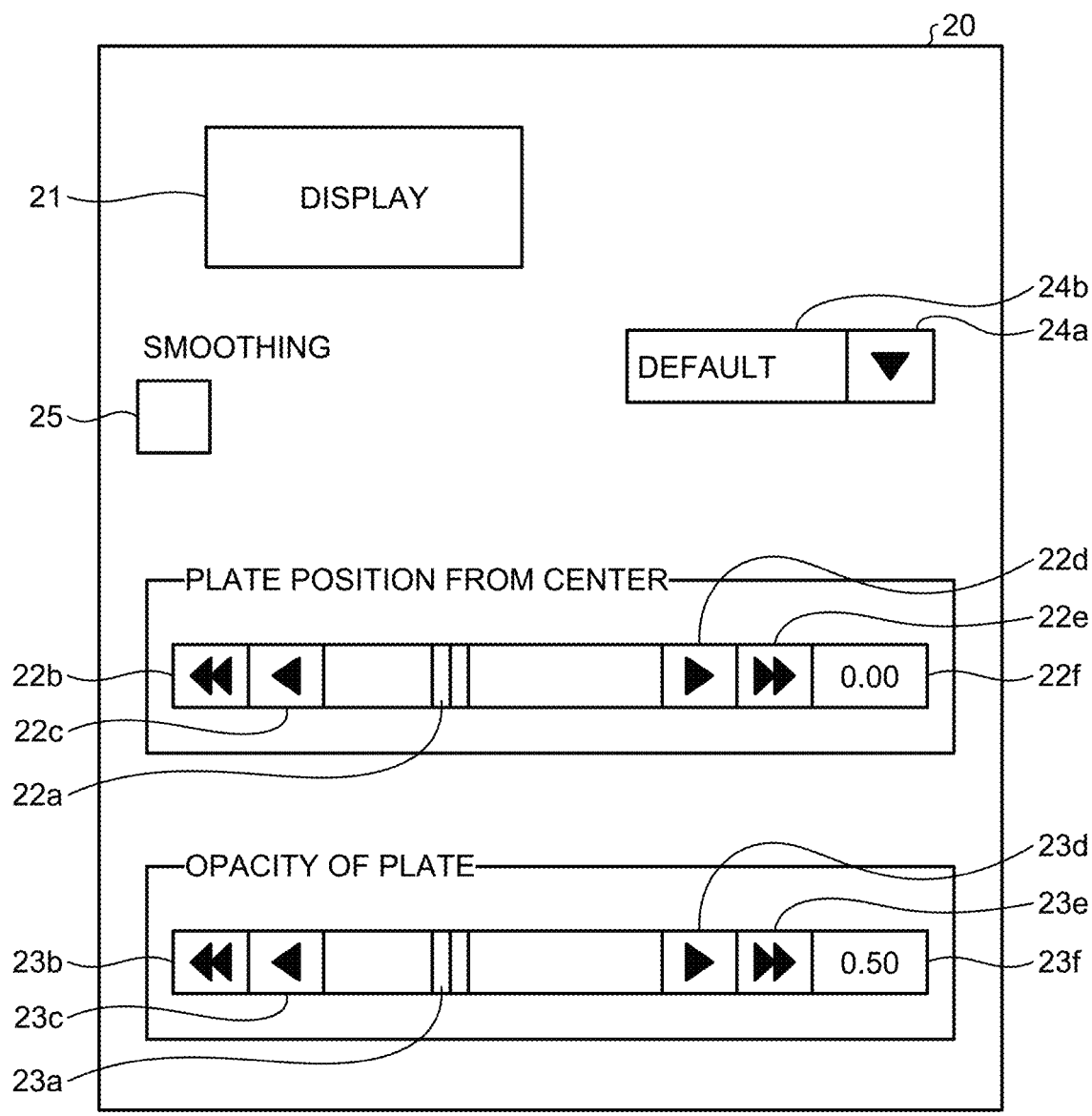
FIG. 16 is a diagram illustrating an example of a setting screen according to a third embodiment.

FIG. 16 is a diagram illustrating an example of the setting screen 20 according to the third embodiment. The setting screen 20 according to the third embodiment illustrated in FIG. 16 differs from the setting screen 20 according to the first embodiment illustrated in FIG. 4 in that it has a check box 25 for determining whether to perform smoothing.

In the third embodiment, when the user allows the medical image processing apparatus 4 to perform smoothing on depth information, the user selects the check box 25 through the input interface 43. When the check box 25 is selected, a predetermined check mark is given in the check box 25. When the user does not allow the medical image processing apparatus 4 to perform smoothing on depth information, the user does not select the check box 25.

Figure 17:
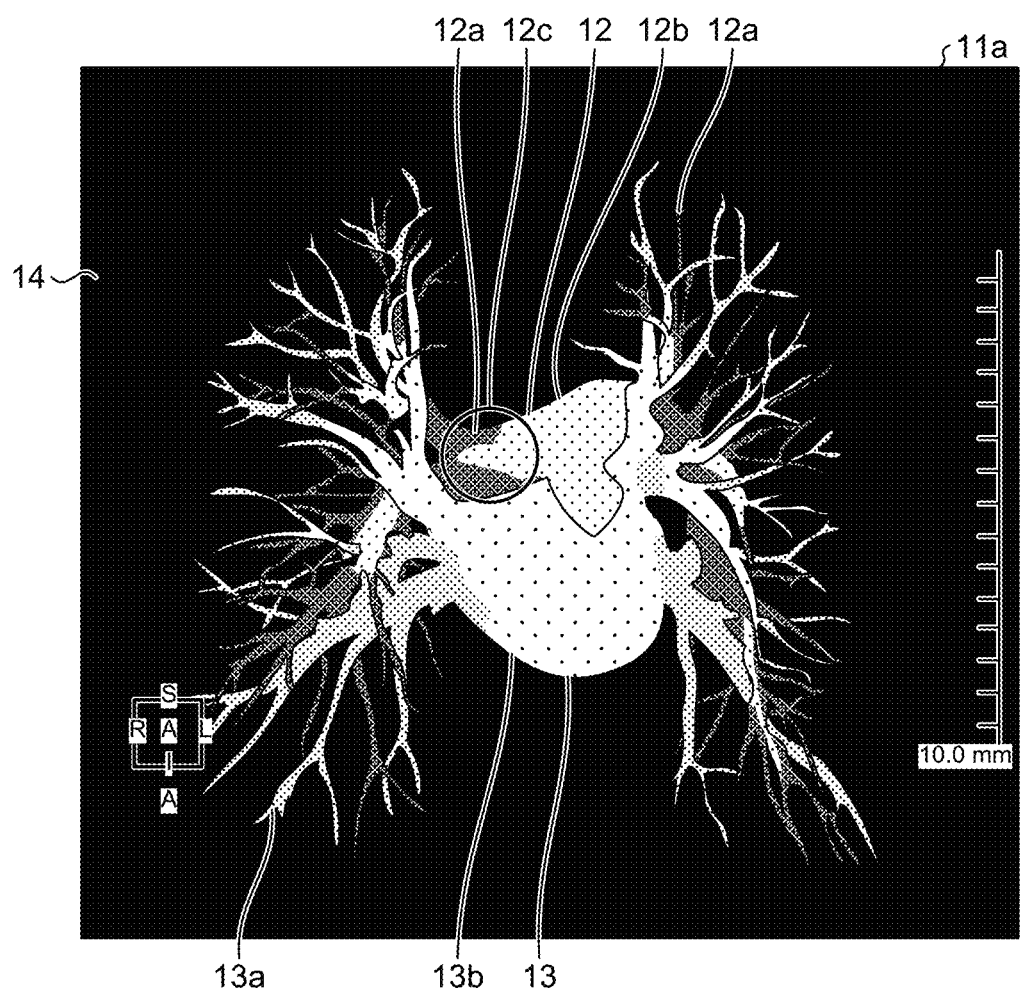
FIG. 17 is a diagram illustrating an example of an image represented by medical image data generated by the image processing function in the third embodiment.

When the check box 25 is selected, the image processing function 45c smooths a plurality of depth information by applying a two-dimensional Gaussian filter to a plurality of depth information arranged in a two-dimensional form. The two-dimensional Gaussian filter is an example of the smoothing filter. The image processing function 45c may smooth a plurality of depth information by applying a smoothing filter other than the Gaussian filter, such as a moving average filter, to a plurality of depth information. The image processing function 45c then generates medical image data representing the second image 11a illustrated in FIG. 17, in the same manner as in the first embodiment, based on a plurality of smoothed depth information. FIG. 17 is a diagram illustrating an example of the second image represented by medical image data generated by the image processing function 45c in the third embodiment.

In the third embodiment, since the image processing function 45c uses the smoothed depth information, the boundary between the back-side portion 12a and the front-side portion 12b of the pulmonary artery 12 becomes smooth as illustrated in the circular region 12c in FIG. 17. Similarly, the boundary between the back-side portion 13a and the front-side portion 13b of the pulmonary vein 13 becomes smooth. The medical image processing apparatus 4 according to the third embodiment therefore can generate image data with satisfactory image quality.

The medical image processing apparatus 4 according to the third embodiment has been described above. The medical image processing apparatus 4 according to the third embodiment can smooth the boundary between the back-side portion 12a and the front-side portion 12b of the pulmonary artery 12 and the boundary between the back-side portion 13a and the front-side portion 13b of the pulmonary vein 13. Further, the medical image processing apparatus 4 according to the third embodiment can allow the user to grasp the positional relation in the depth direction of a plurality of portions of the pulmonary artery 12 and a plurality of portions of the pulmonary vein 13, in the same manner as in the first embodiment, for example.

Fourth Embodiment

In the foregoing embodiments, the image processing function 45c generates medical image data representing the second image 11a that can allow the user to easily grasp the positional relation in the depth direction of a plurality of portions of a structure, using image data for composition to which the same color as the background is allocated. However, the image processing function 45c may generate medical image data representing the second image in which a certain structure is highlighted, using image data for composition to which a color different from the background is allocated. Such an embodiment is described as a fourth embodiment.

In the fourth embodiment, the differences from the foregoing embodiments are mainly described, and a description of a configuration and a process similar to the foregoing embodiments may be omitted. In the fourth embodiment, a configuration similar to the foregoing embodiment is denoted by the same reference sign as in the foregoing embodiment, and a description thereof may be omitted.

Figure 18:
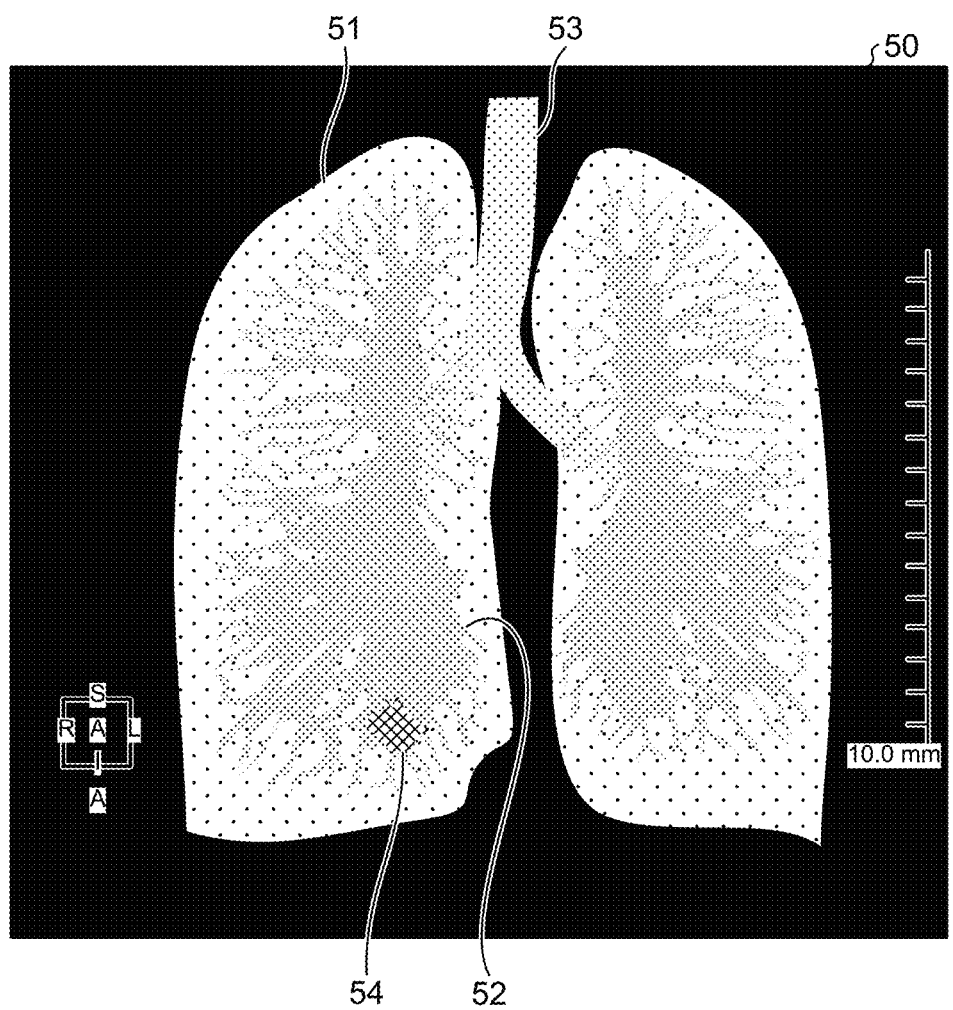
FIG. 18 is a diagram illustrating an example of the first image according to a fourth embodiment.

FIG. 18 is a diagram illustrating an example of the first image according to the fourth embodiment. In a first image 50 illustrated in FIG. 18, a lung 51, a blood vessel 52 of the lung 51, a bronchus 53, and a tumor 54 are rendered. In the fourth embodiment, the image generating function 45b generates, for example, volume rendering image data representing the first image 50.

The image generating function 45b allocates, for example, green to all the pixels that constitute the region of the lung 51. The image generating function 45b allocates, for example, blue to all the pixels that constitute the region of the blood vessel 52. The image generating function 45b allocates, for example, purple to all the pixels that constitute the region of the bronchus 53. The image generating function 45b allocates, for example, yellow to all the pixels that constitute the region of the tumor 54.

In the fourth embodiment, the image processing function 45c generates medical image data representing the second image such that, of four structures, i.e., the lung 51, the blood vessel 52, the bronchus 53, and the tumor 54, the certain tumor 54 is highlighted. An example of the method of generating such medical image data will be described below.

Figure 19:
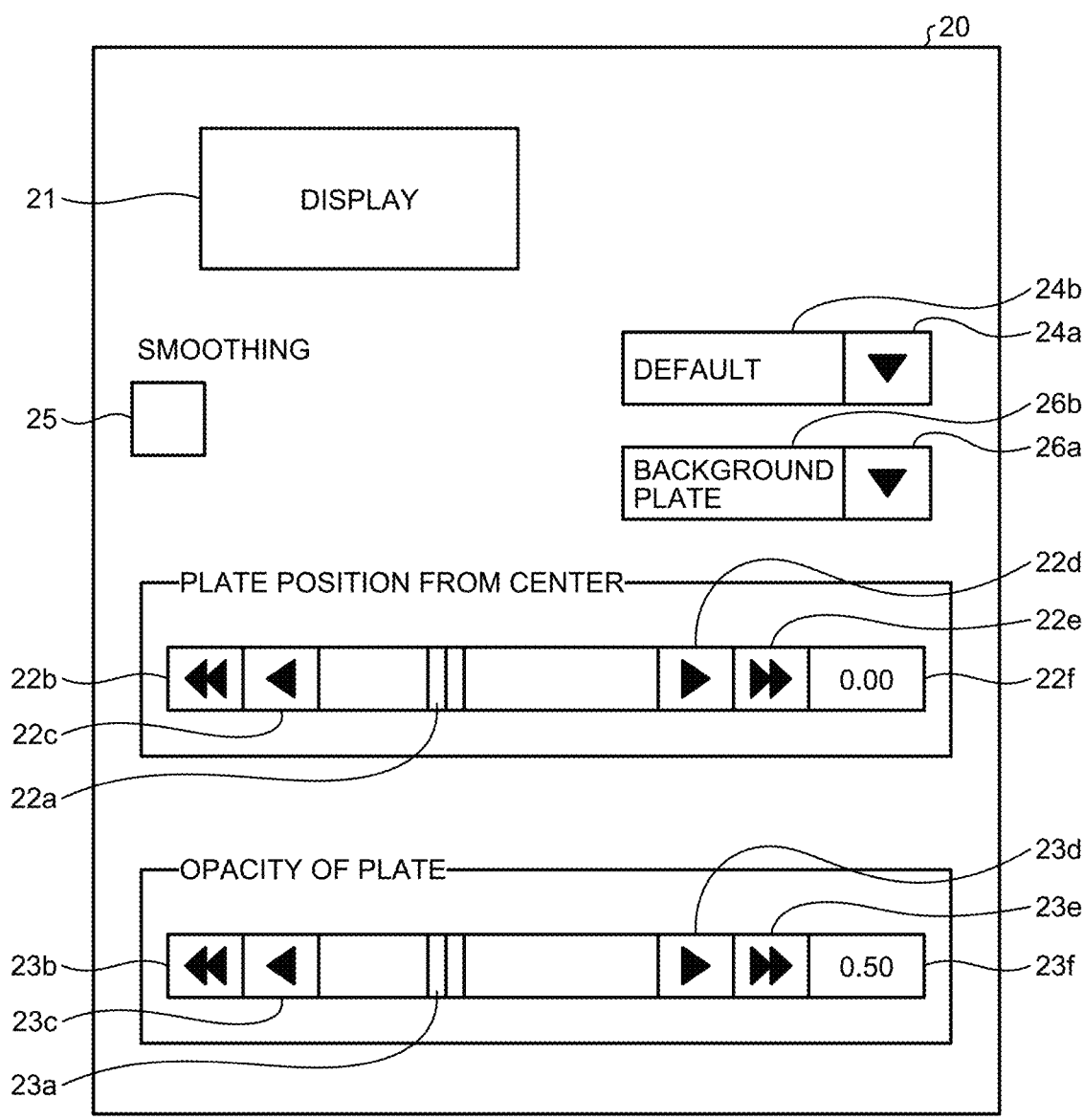
FIG. 19 is a diagram illustrating an example of the setting screen according to the fourth embodiment.

FIG. 19 is a diagram illustrating an example of the setting screen 20 according to the fourth embodiment. The setting screen 20 according to the fourth embodiment illustrated in FIG. 19 differs from the setting screen 20 according to the third embodiment illustrated in FIG. 16 in that it has a button 26a and a display region 26b.

Figure 20:
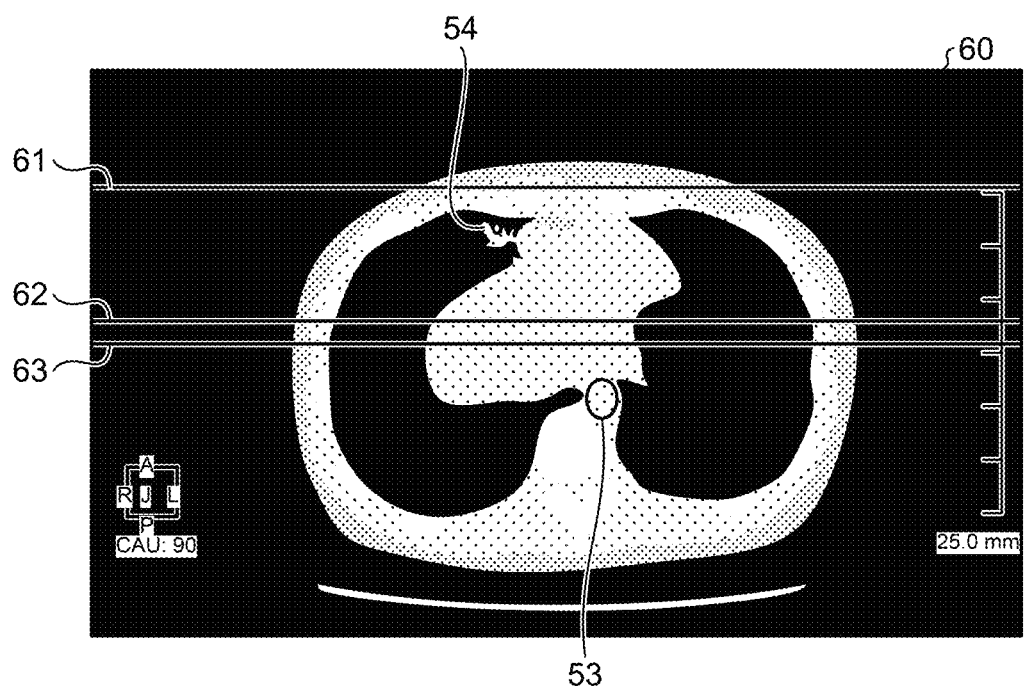
FIG. 20 is a diagram illustrating an example of the reference image according to the fourth embodiment.

In the fourth embodiment, a plurality of plates can be used in addition to the plate (background plate) in the first embodiment. FIG. 20 is a diagram illustrating an example of the reference image according to the fourth embodiment. FIG. 20 illustrates a coronal cross-section image 60 that is an example of the reference image. In the fourth embodiment, the image generating function 45b performs a MPR process on three-dimensional medical image data to generate reference image data representing the coronal cross-section image 60 in which a part of the pulmonary artery and a part of the pulmonary vein are rendered. The image generating function 45b superimposes a mark 61 indicating a first plate at a position in the coronal cross-section image 60 corresponding to the position of the first plate set through the setting screen 20. Similarly, the image generating function 45b superimposes a mark 62 indicating a second plate at a position in the coronal cross-section image 60 corresponding to the position of the second plate set through the setting screen 20. The image generating function 45b superimposes a mark 63 indicating a third plate at a position in the coronal cross-section image 60 corresponding to the position of the third plate set through the setting screen 20. In this way, the image generating function 45b generates superimposed image data in which three marks 61, 62, and 63 corresponding to three plates: the first plate, the second plate, and the third plate are superimposed on the coronal cross-section image 60.

In FIG. 20, the eye point is set on the upper side of the first plate, and the eye direction is the direction from the upper side to the lower side. The first plate is therefore set so as to be closer to the eye point than the tumor 54, and both the second plate and the third plate are set between the tumor 54 and the bronchus 53.

In the present embodiment, four plates, i.e., background plate, first plate, second plate, and third plate, can be used. However, the number of plates that can be used is not limited to four. The number of plates that can be used may be less than four or greater than four. In this way, although four plates can be used in the present embodiment, in the following description, three plates excluding the background plate, that is, the first plate, the second plate, and the third plate are used when medical image data representing the second image is generated such that the certain tumor 54 is highlighted. The first plate, the second plate, and the third plate are plates having planar transmittance in which the eye direction is a normal vector. The first plate, the second plate, and the third plate can move along the eye direction.

For example, when the user presses the button 26a, a list of names of four plates appears on the display 44. Then, when the user selects, from the list of names, the name of one target plate for which the position of the plate and the opacity of the plate are to be set, the selected name appears in the display region 26b. The slider bar 22a is moved to the position depending on the position of the plate corresponding to the selected name. The slider bar 23a is moved to the position depending on the opacity of the plate corresponding to the selected name.

For example, when "first plate" is selected from the list of names of four plates, the slider bar 22a is moved to a position depending on a second threshold corresponding to the position of the first plate. When "first plate" is selected from the list of names of four plates, the slider bar 23a is moved to a position depending on the opacity of the first plate. When "first plate" is selected, the slider bar 22a, the buttons 22b to 22e, and the display region 22f are used for setting the second threshold. When "first plate" is selected, the slider bar 23a, the buttons 23b to 23e, and the display region 23f are used for setting the opacity of image data for composition corresponding to the first plate. The user therefore can set the second threshold and the opacity of image data for composition corresponding to the first plate by selecting the "first plate". Setting the second threshold is synonymous with setting the position of the first plate.

When "second plate" is selected from the list of names of four plates, the slider bar 22a is moved to a position depending on a third threshold corresponding to the position of the second plate. When "second plate" is selected from the list of names of four plates, the slider bar 23a is moved to a position depending on the opacity of the second plate. When "second plate" is selected, the slider bar 22a, the buttons 22b to 22e, and the display region 22f are used for setting the third threshold. When "second plate" is selected, the slider bar 23a, the buttons 23b to 23e, and the display region 23f are used for setting the opacity of image data for composition corresponding to the second plate. The user therefore can set the third threshold and the opacity of image data for composition corresponding to the second plate by selecting the "second plate". Setting the third threshold is synonymous with setting the position of the second plate.

When "third plate" is selected from the list of names of four plates, the slider bar 22a is moved to a position depending on a fourth threshold corresponding to the position of the third plate. When "third plate" is selected from the list of names of four plates, the slider bar 23a is moved to a position depending on the opacity of the third plate. When "third plate" is selected, the slider bar 22a, the buttons 22b to 22e, and the display region 22f are used for setting the fourth threshold. When "third plate" is selected, the slider bar 23a, the buttons 23b to 23e, and the display region 23f are used for setting the opacity of image data for composition corresponding to the third plate. The user therefore can set the fourth threshold and the opacity of image data for composition corresponding to the third plate by selecting the "third plate". Setting the fourth threshold is synonymous with setting the position of the third plate.

The image processing function 45c compares depth information with the second threshold, for each pixel that constitutes the first image 50. Specifically, the image processing function 45c determines whether the depth information is equal to or greater than the second threshold, pixel by pixel.

The image processing function 45c then generates new image data by combining pixel data with image data for composition of one pixel corresponding to the first plate, pixel by pixel, for pixels with depth information equal to or greater than the second threshold, in volume rendering image data representing the first image 50. The thus generated new image data is denoted as "image data D1" in the following description. As used herein, the image data for composition corresponding to the first plate is, for example, image data having predetermined opacity (the degree of opaqueness) and to which red is allocated. The opacity of the image data for composition corresponding to the first plate is greater than 0.00 (fully transparent) and less than 1.00 (fully opaque).

The image data D1 is two-dimensional image data. An image represented by the image data D1 is denoted as "image I1".

The image processing function 45c then compares depth information with the third threshold, for each pixel that constitutes the image I1. Specifically, the image processing function 45c determines whether the depth information is equal to or greater than the third threshold, pixel by pixel.

The image processing function 45c then generates new image data by combining pixel data with image data for composition of one pixel corresponding to the second plate, pixel by pixel, for pixels with depth information equal to or greater than the third threshold, in the image data D1 representing the image I1. The thus generated new image data is denoted as "image data D2" in the following description. As used herein, the image data for composition corresponding to the second plate is, for example, image data having predetermined opacity and to which blue is allocated. The opacity of the image data for composition corresponding to the second plate is greater than 0.00 and less than 1.00.

The image data D2 is two-dimensional image data. An image represented by the image data D2 is denoted as "image I2".

The image processing function 45c then compares depth information with the fourth threshold, for each pixel that constitutes the image I2. Specifically, the image processing function 45c determines whether the depth information is equal to or greater than the fourth threshold, pixel by pixel.

Figure 21:
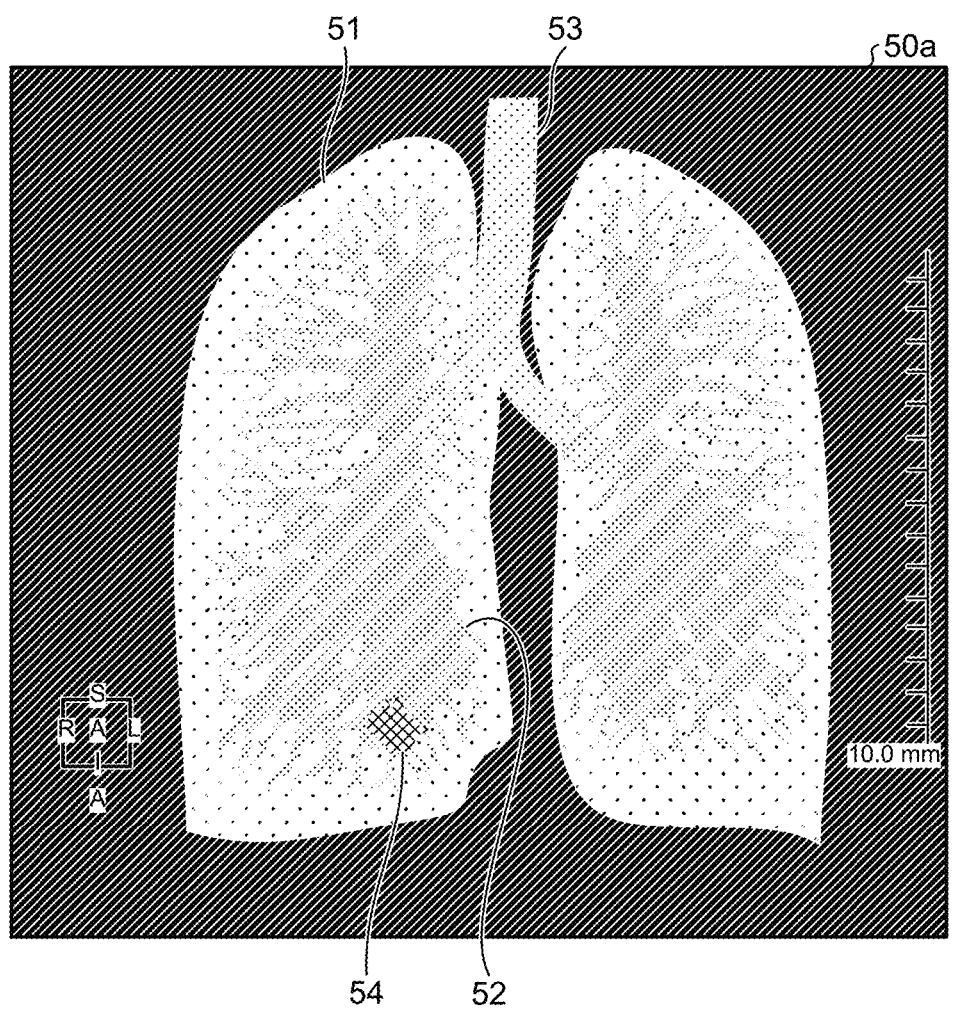
FIG. 21 is a diagram illustrating an example of a second image according to the fourth embodiment.

The image processing function 45c then generates medical image data representing a second image 50a illustrated in FIG. 21 by combining pixel data with image data for composition of one pixel corresponding to the third plate, pixel by pixel, for pixels with depth information equal to or greater than the fourth threshold, in the image data D2 representing the image I2. As used herein, the image data for composition corresponding to the third plate is, for example, image data having predetermined opacity and to which green is allocated. The opacity of the image data for composition corresponding to the third plate is greater than 0.00 and less than 1.00. The second image 50a is a two-dimensional medical image. FIG. 21 is a diagram illustrating an example of the second image according to the fourth embodiment.

With such a method, the image processing function 45c can generate medical image data representing the second image 50a based on the three-dimensional medical image data as if a red first plate is arranged as image data for composition at a position at a distance corresponding to the second threshold from the eye point, a blue second plate is arranged as image data for composition at a position at a distance corresponding to the third threshold from the eye point, and a green third plate is arranged as image data for composition at a position at a distance corresponding to the fourth threshold from the eye point. The second image 50a is an example of the medical image. The medical image data representing the second image 50a is an example of the second medical image data.

Here, red is allocated to the image data for composition corresponding to the first plate. Yellow is allocated to the tumor 54 present on the back side of the second threshold. When the yellow-allocated image data and the red-allocated image data are combined, composite data in which a highlighted color is allocated is generated. With this process, the highlighted color is allocated to the tumor 54 illustrated in FIG. 21 configured with composite image data in which data of the pixels that constitute the tumor 54 illustrated in FIG. 18 and image data for composition corresponding to the first plate are combined.

The same color as blue allocated to the image data for composition corresponding to the second plate is allocated to the blood vessel 52 of the lung 51. The blood vessel 52 therefore is less noticeable in the second image 50a illustrated in FIG. 21.

The same color as green allocated to the image data for composition corresponding to the third plate is allocated to the lung 51. The lung 51 therefore is less noticeable in the second image 50a.

Purple is allocated to the bronchus 53. Red allocated to the image data for composition corresponding to the first plate and blue allocated to the image data for composition corresponding to the second plate are mixed into purple. The bronchus 53 therefore is less noticeable in the second image 50a.

In this way, in the fourth embodiment, the color corresponding to the color allocated to the structure of the subject rendered in the first image 50 is allocated to the image data for composition.

In the fourth embodiment, therefore, the image processing function 45c generates medical image data representing the second image 50a such that, of four structures, i.e., the lung 51, the blood vessel 52, the bronchus 53, and the tumor 54, the certain tumor 54 is highlighted. The display control function 45d then displays the second image 50a on the display 44.

In the fourth embodiment, when information indicating the colors allocated to a plurality of structures of a subject is stored in the memory 42, the image processing function 45c may refer to the information indicating colors and automatically allocate a color that highlights a certain structure among a plurality of structures to the image data for composition. A specific example will be described. For example, a case where information indicating that the color allocated to the tumor 54 is yellow is stored in the memory 42 and the user operates the input interface 43 to specify the tumor 54 as a structure to be highlighted will be described. In this case, the image processing function 45c automatically allocates red for highlighting the yellow tumor 54 to the plate and sets the plate to which red is allocated so as to be closer to the eye point than the tumor 54.

The medical image processing apparatus 4 according to the fourth embodiment has been described above. The medical image processing apparatus 4 according to the fourth embodiment highlights the tumor 54. This configuration enables the user to easily grasp a certain structure.

According to at least one of the embodiments described above, the user can grasp the positional relation in the depth direction of a plurality of portions of the pulmonary artery 12 and a plurality of portions of the pulmonary vein 13 or information useful for diagnosing a subject such as a certain structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus comprising:
   a memory configured to store (1) a combination of a specified threshold and opacity in association with three-dimensional medical image data and (2) versatility information associated with the combination of the specified threshold and opacity indicating whether the combination is able to be used versatilely; and
   processing circuitry configured to:
   acquire from the memory the three-dimensional medical image data in which a structure of a subject is rendered;
   acquire the threshold and the opacity stored in the memory;
   set an eye point and an eye direction in the three-dimensional medical image data;
   generate two-dimensional first medical image data from the three-dimensional medical image data;
   generate, using the acquired threshold or a threshold after the acquired threshold is changed, two-dimensional second medical image data in which display manners differ between a first portion on an opposite side to the eye point side in the eye direction of the structure rendered in the two-dimensional first medical image data and a second portion on the eye point side of the structure rendered in the two-dimensional first medical image data; and
   display a medical image represented by the second medical image data on a display;
   generate a plurality of depth information corresponding to a plurality of pixels that constitute the two-dimensional first medical image data and generates the second medical image data in which display manners differ between the first portion constituted with a pixel with the depth information equal to or greater than a threshold and the second portion constituted with a pixel with the depth information less than the threshold, in data of the plurality of pixels that constitute the first medical image data, based on the depth information;

generate the second medical image data by combining
(a) data of a pixel with depth information equal to or
greater than the threshold, in data of the plurality of
pixels that constitute the first medical image data,
with (b) image data having transmittance and opacity
depending on the depth information, and to which a
same color as a color of a background of a medical
image represented by the first medical image data is
allocated, based on the depth information, in the first
medical image data;

generate another first medical image data from another
three-dimensional medical image data when the versatility information indicates that the combination is
able to be used versatilely, and generate another second medical image data from
another first medical image data, using the acquired
threshold or the threshold after the acquired threshold is changed, and the image data having the
acquired opacity or the opacity after the acquired
opacity is changed.

2. The medical image processing apparatus according to claim 1, wherein the processing circuitry changes the opacity such that as the depth information increases, the opacity increases.

3. The medical image processing apparatus according to claim 1, wherein when the color of the background is changed, the processing circuitry generates the second medical image data by combining data of a pixel with the depth information equal to or greater than the threshold with image data having transmittance and to which a same color as the changed color of the background is allocated.

4. The medical image processing apparatus according to claim 1, wherein the processing circuitry generates composite image data by combining data of a pixel with depth information equal to or greater than the threshold, in data of the plurality of pixels that constitute the first medical image data, with image data having transmittance and to which a same color as a color of a background of a medical image represented by the first medical image data is allocated, based on the depth information, and generates the second medical image data by replacing data of a pixel with the depth information equal to or greater than the threshold in the first medical image data with the composite image data.

5. The medical image processing apparatus according to claim 1, wherein the processing circuitry corrects the threshold based on a first size in real space of a voxel of the three-dimensional medical image data and a second size in real space of a voxel of the other three-dimensional medical image data and generates the second medical image data from first medical image data generated from the other three-dimensional medical image data, using the corrected threshold.

6. The medical image processing apparatus according to claim 1, wherein the processing circuitry
generates reference image data representing a reference image from the three-dimensional medical image data,
generates superimposed image data in which boundary information indicating a boundary between the first portion and the second portion is superimposed on the reference image data, and
displays a superimposed image represented by the superimposed image data on the display.

7. The medical image processing apparatus according to claim 1, wherein the processing circuitry
generates reference image data representing a reference image from the three-dimensional medical image data,
generates superimposed image data in which boundary information indicating a boundary between the first portion and the second portion is superimposed on the reference image data,
displays a setting screen for accepting a threshold to be set, together with a superimposed image represented by the superimposed image data, on the display, and
generates the superimposed image data in which the boundary information is superimposed at a position on the reference image depending on the threshold accepted through the setting screen.

8. The medical image processing apparatus according to claim 7, wherein when the position of the boundary information on the reference image is changed, the processing circuitry generates the second medical image data using the threshold changed in conjunction with change in position of the boundary information.

9. The medical image processing apparatus according to claim 1, wherein the processing circuitry smooths the depth information and generates the second medical image data based on the smoothed depth information.

10. A medical image processing method comprising:
acquiring from a memory (1) three-dimensional medical image data in which a structure of a subject is rendered, (2) a combination of a specified threshold and opacity in association with the three-dimensional medical image data, and (3) versatility information associated with the combination of the specified threshold and opacity indicating whether the combination is able to be used versatilely;
setting an eye point and an eye direction in the three-dimensional medical image data;
generating two-dimensional first medical image data from the three-dimensional medical image data;
generating, using the acquired threshold or a threshold after the acquired threshold is changed, two-dimensional second medical image data in which display manners differ between a first portion on an opposite side to the eye point side in the eye direction of the structure rendered in the two-dimensional first medical image data and a second portion on the eye point side of the structure rendered in the two-dimensional first medical image data;
displaying a medical image represented by the second medical image data on a display, wherein the generating two-dimensional second medical image data comprises generating the second medical image data by combining data of a pixel with depth information equal to or greater than the threshold, in data of the plurality of pixels that constitute the first medical image data, with image data having transmittance and opacity depending on the depth information, and to which a same color as a color of a background of a medical image represented by the first medical image data is allocated, based on the depth information, in the first medical image data;
generating another first medical image data from another three-dimensional medical image data when the versatility information indicates that the combination is able to be used versatilely, and
generating another second medical image data from another first medical image data, using the acquired threshold or the threshold after the acquired threshold is changed, and the image data having the acquired opacity or the opacity after the acquired opacity is changed.

* * * * *